(12) United States Patent
Suraci et al.

(10) Patent No.: US 11,736,009 B2
(45) Date of Patent: Aug. 22, 2023

(54) ZERO CURRENT TEMPORAL THRESHOLD FOR SWITCHING TO A LOW POWER MODE

(71) Applicant: STMicroelectronics S.r.l., Agrate Brianza (IT)

(72) Inventors: Michele Suraci, Varese (IT); Marco Borghese, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 141 days.

(21) Appl. No.: 17/482,961

(22) Filed: Sep. 23, 2021

(65) Prior Publication Data

US 2022/0109369 A1 Apr. 7, 2022

(30) Foreign Application Priority Data

Oct. 2, 2020 (IT) .......................... 102020000023299

(51) Int. Cl.
*H02M 3/158* (2006.01)
*H02M 1/00* (2006.01)

(52) U.S. Cl.
CPC ......... *H02M 3/158* (2013.01); *H02M 1/0032* (2021.05)

(58) Field of Classification Search
CPC ...... H02M 1/0032; H02M 3/155–1588; H02H 3/247; H02H 3/093
See application file for complete search history.

(56) References Cited

U.S. PATENT DOCUMENTS 8,598,856 B1 12/2013 Carroll et al.
10,027,219 B1 * 7/2018 Ye ......................... H02M 3/157
(Continued)

FOREIGN PATENT DOCUMENTS

CN 110138209 A 8/2019
GB 2559630 A 8/2018

OTHER PUBLICATIONS

Wuidart, L., "Topologies for Switched Mode Power Supplies", STMicroelectronics Application Note AN513/0393, 1999, 18 pages.

*Primary Examiner* — Peter M Novak
(74) *Attorney, Agent, or Firm* — Slater Matsil, LLP

(57) ABSTRACT

In an embodiment a control circuit includes a low-power detection circuit configured to generate a control signal, wherein the low-power detection circuit is, when a driver circuit operates in a high-power mode, configured to determine a first temporal value indicative of a duration of a second phase ($T_2$), detect whether a logic level of a zero current signal changes from a first logic level to a second logic level during the second phase ($T_2$), in response to detecting that the logic level of the zero current signal changes from the first logic level to the second logic level, determine a second temporal value indicative of a time ($T_{ZC}$) elapsed between an instant ($t_3$) when the logic level of the zero current signal changes from the first logic level to the second logic level during the second phase ($T_2$) and the instant ($t_1$) when the second phase ($T_2$) ends, determine whether a ratio between the second temporal value ($T_{ZC}$) and the first temporal value ($T_2$) is greater than a given number threshold value (TH), in response to determining that the ratio between the second temporal value ($T_{ZC}$) and the first temporal value ($T_2$) is smaller than the given threshold value (TH), set a comparison signal to the first logic level indicating that the high-power mode is to be maintained, in response to determining that the ratio between the second temporal value ($T_{ZC}$) and the first temporal value ($T_2$) is greater than the given threshold value (TH), set the comparison signal to the second logic level indicating that a low-power mode is to be activated and set the logic level of the control signal as a function of the comparison signal.

16 Claims, 14 Drawing Sheets

(56) References Cited

U.S. PATENT DOCUMENTS

| | | | | |
|---|---|---|---|---|
| 2010/0320983 A1* | 12/2010 | Wu | ...................... | H02M 3/156 |
| | | | | 323/283 |
| 2016/0308441 A1* | 10/2016 | Chen | .................... | H02M 3/158 |
| 2020/0366207 A1 | 11/2020 | Luo | | |

* cited by examiner

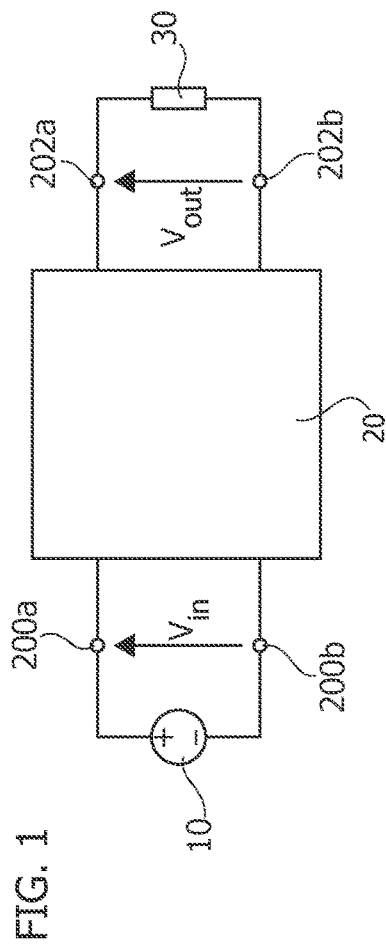
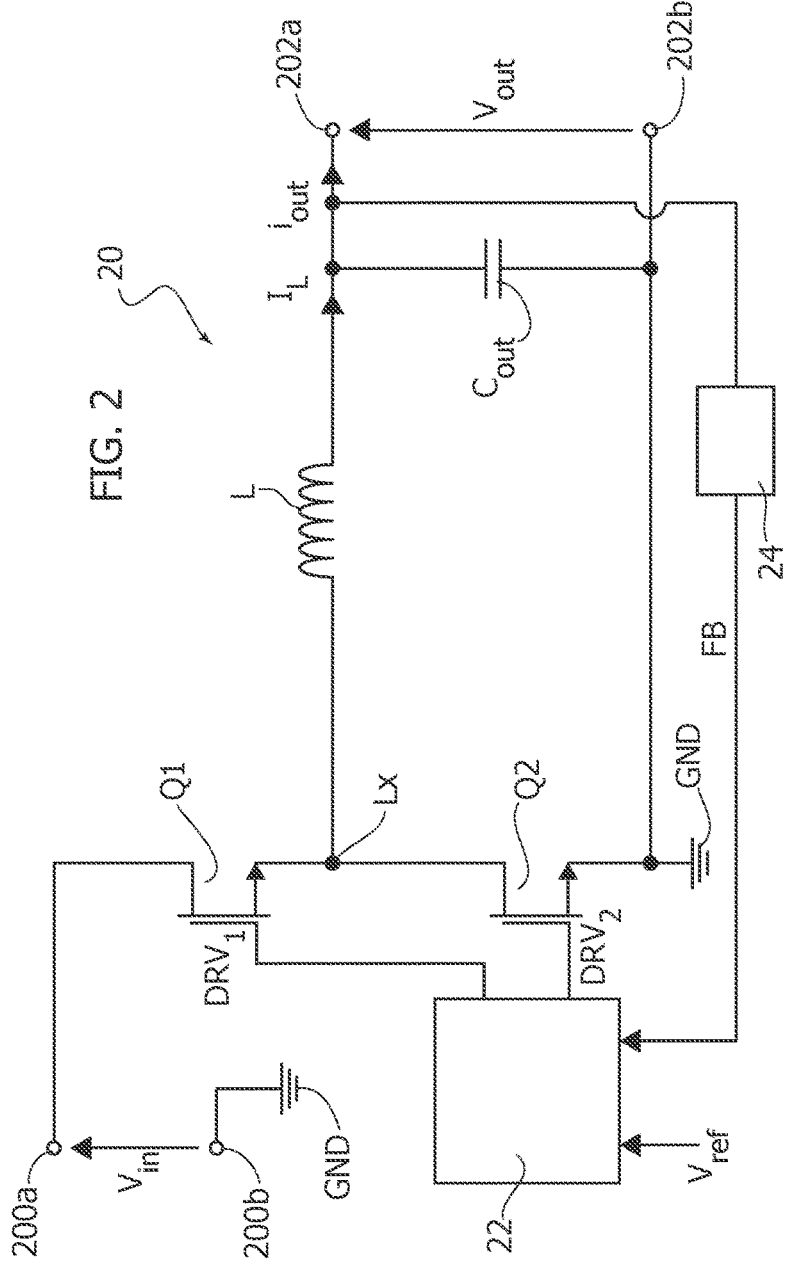
FIG. 1
FIG. 2

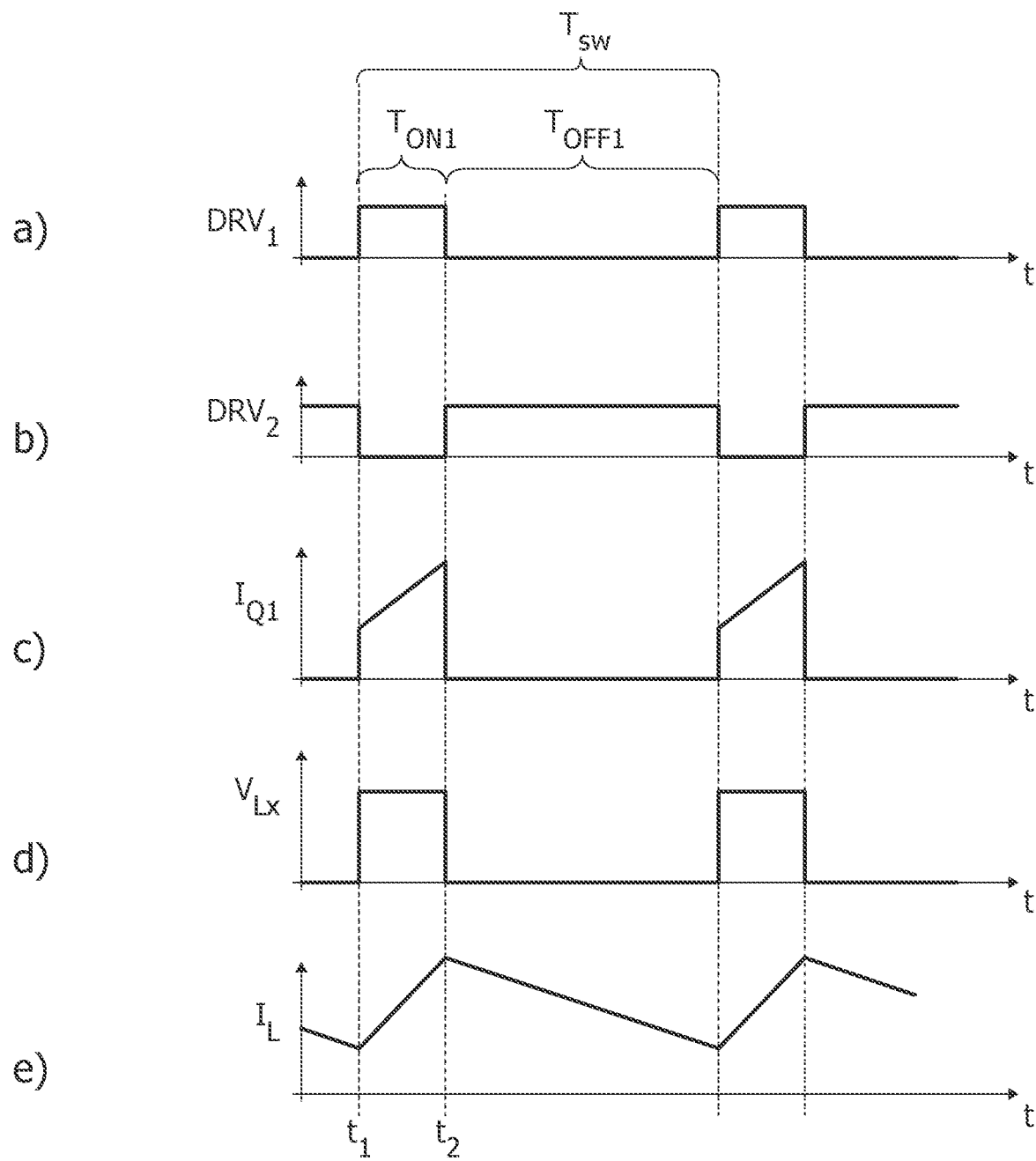

FIG. 12A
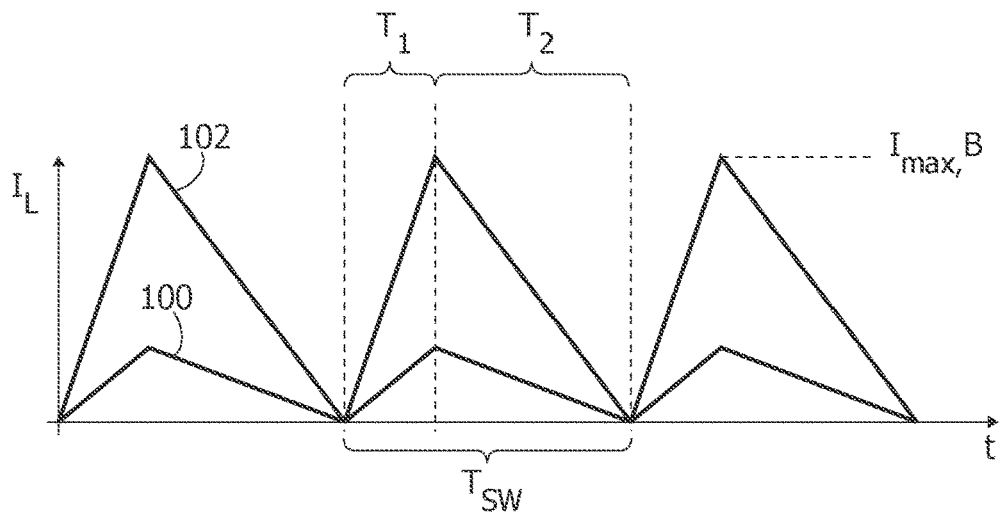
FIG. 12B
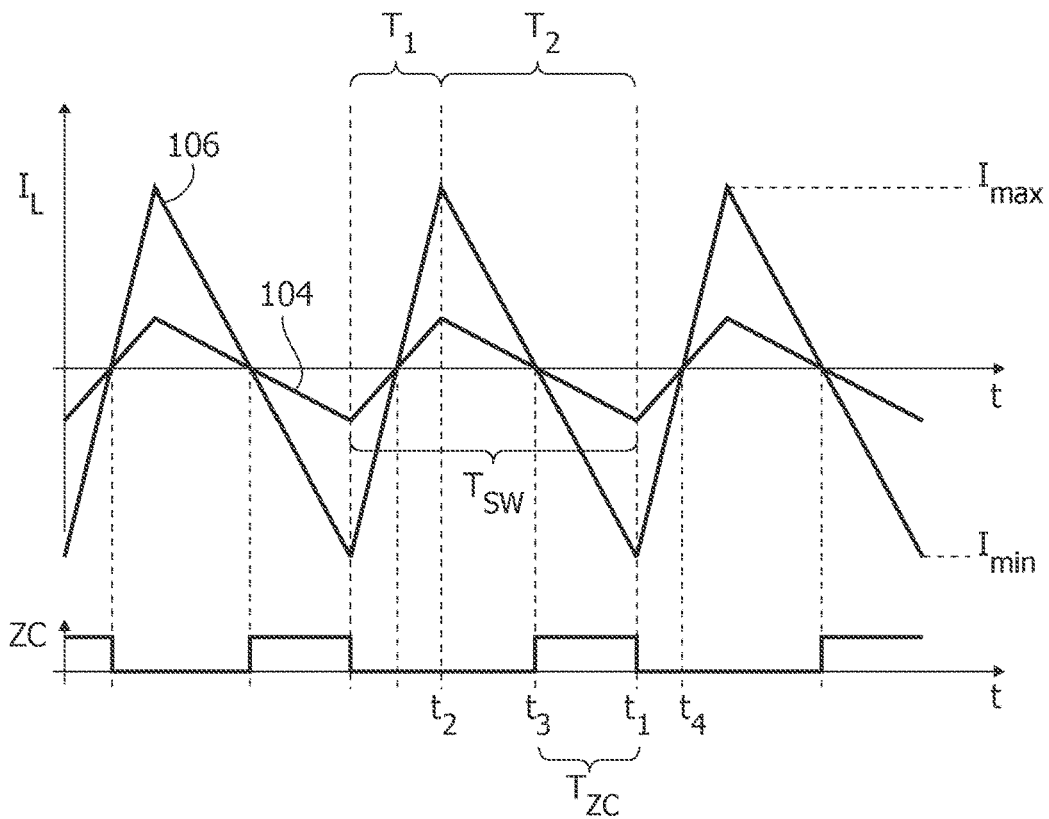

ZERO CURRENT TEMPORAL THRESHOLD FOR SWITCHING TO A LOW POWER MODE

CROSS-REFERENCE TO RELATED APPLICATIONS

This application claims the benefit of Italian Patent Application No. 102020000023299, filed on Oct. 2, 2020, which application is hereby incorporated herein by reference.

TECHNICAL FIELD

The embodiments of the present description refer to a control device for an electronic converter, such as a buck converter.

BACKGROUND

Power-supply circuits, such as AC/DC or DC/DC switched mode power supplies, are well known in the art. There exist many types of electronic converters, which are mainly divided into isolated and non-isolated converters. For instance, non-isolated electronic converters are the converters of the "buck", "boost", "buck-boost", "Ćuk", "SEPIC", and "ZETA" type. Instead, isolated converters are, for instance, converters of the "flyback", "forward", "half-bridge", and "full-bridge" type. Such types of converters are well known to the person skilled in the art, as evidenced e.g. by the application note AN513/0393 "*Topologies for Switched Mode Power Supplies*", L. Wuidart, 1999, STMicroelectronics.

FIG. 1 is a schematic illustration of a DC/DC electronic converter 20. In particular, a generic electronic converter 20 comprises two input terminals 200a and 200b for receiving a DC voltage $V_{in}$ and two output terminals 202a and 202b for supplying a DC voltage $V_{out}$. For example, the input voltage $V_{in}$ may be supplied by a DC voltage source 10, such as a battery, or may be obtained from an AC voltage by means of a rectifier circuit, such as a bridge rectifier, and possibly a filtering circuit. Instead, the output voltage $V_{out}$ may be used to supply a load 30.

FIG. 2 shows the circuit schematic of a typical buck converter 20. In particular, a buck converter 20 comprises two input terminals 200a and 200b for receiving a DC input voltage $V_{in}$ and two output terminals 202a and 202b for supplying a regulated voltage $V_{out}$, where the output voltage is equal to or lower than the input voltage $V_{in}$.

In particular, typically, a buck converter 20 comprises two electronic switches Q1 and Q2 (with the current path thereof) connected (e.g. directly) in series between the input terminals 200a and 200b, wherein the intermediate node between the electronic switches Q1 and Q2 represents a switching node Lx. Specifically, the electronic switch Q1 is a high-side switch connected (e.g. directly) between the (positive) terminal 200a and the switching node Lx, and the electronic switch Q2 is a low-side switch connected (e.g. directly) between the switching node Lx and the (negative) terminal 200b, which often represents a ground GND. The (high-side) switch Q1 and the (low-side) switch Q2 hence represent a half-bridge configured to connect the switching node Lx to the terminal 200a (voltage $V_{in}$) or the terminal 200b (ground GND).

For example, the switches Q1 and/or Q2 are often transistors, such as Field-Effect Transistors (FETs), such as Metal-Oxide-Semiconductor Field-Effect Transistors (MOSFETs), e.g. n-channel FET, such as NMOS. Frequently, the second electronic switch Q2 is also implemented just with a diode, where the anode is connected to the terminal 200b and the cathode is connected to the switching node Lx.

In the example considered, an inductance L, such as an inductor, is connected (e.g. directly) between the switching node Lx and the (positive) output terminal 202a. Instead, the (negative) output terminal 202b is connected (e.g. directly) to the (negative) input terminal 200b.

In the example considered, to stabilize the output voltage $V_{out}$, the converter 20 typically comprises a capacitor Cout connected (e.g., directly) between the output terminals 202a and 202b.

In this context, FIG. 3 shows exemplary waveforms of the signals of such an electronic converter, where:
- FIG. 3a shows the signal $DRV_1$ for switching the electronic switch Q1;
- FIG. 3b shows the signal $DRV_2$ for switching the second electronic switch Q2;
- FIG. 3c shows the current $I_{Q1}$ that traverses the electronic switch Q1;
- FIG. 3d shows the voltage $V_{Lx}$ at the switching node Lx (i.e., the voltage at the second switch Q2); and
- FIG. 3e shows the current $I_L$ that traverses the inductor L.

In particular, when the electronic switch Q1 is closed at an instant $t_1$ (ON state), the current $I_L$ in the inductor L increases (substantially) linearly. The electronic switch Q2 is at the same time opened. Instead, when the electronic switch Q1 is opened after an interval $T_{ON1}$ at an instant $t_2$ (OFF state), the electronic switch Q2 is closed, and the current $I_L$ decreases (substantially) linearly. Finally, the switch Q1 is closed again after an interval $T_{OFF1}$. In the example considered, the switch Q2 is hence closed when the switch Q1 is open, and vice versa. The current $I_L$ may thus be used to charge the capacitor Cout, which supplies the voltage $V_{out}$ at the terminals 202a and 202b.

In the example considered, the electronic converter 20 comprises thus a control circuit 22 configured to drive the switching of the switch Q1 and of the switch Q2, for repeating the intervals $T_{ON1}$ and $T_{OFF1}$ periodically. For example, typically the buck converter 20 comprises also a feedback circuit 24, such as a voltage divider, configured to generate a feedback signal FB indicative of (and preferably proportional to) the output voltage $V_{out}$, and the control circuit 22 is configured to generate the drive signals $DRV_1$ and $DRV_2$ by comparing the feedback signal FB with a reference signal, such as a reference voltage $V_{ref}$.

A significant number of driving schemes are known for generating the drive signals $DRV_1$ and $DRV_2$. These solutions have in common the possibility of regulating the output voltage $V_{out}$ by regulating the duration of the interval $T_{ON1}$ and/or the interval $T_{OFF1}$. For example, in many applications, the control circuit 22 generates a Pulse-Width Modulation (PWM) signal $DRV_1$, wherein the duty cycle $T_{ON1}$ $(T_{ON1}+T_{OFF1})$ is variable, and the duration of the switching interval $T_{SW}=T_{ON1}+T_{OFF1}$ is constant. For example, a typical control scheme involves that the duration of the interval TON1 is varied via a regulator circuit having at least an integral component, such as a PI (Proportional-Integral) or PID (Proportional-Integral-Derivative) regulator.

In general, a buck converter may be operated in a Continuous-Conduction Mode (CCM), Discontinuous-Conduction Mode (DCM) or Transition Mode (TM). For example, various control circuit 22 are known, wherein the control circuit is configured to selectively operate the switching stage in a High-Power Mode (HPM) or in a Low-Power Mode (LPM).

For example, in the high-power mode, the control circuit 22 may be configured to drive the switches in CCM. As shown in FIG. 4A, when the control circuit 20 operates the converter in CCM, the current $I_L$ flowing through the inductance L has a value different from zero when the switching cycle $T_{SW}$ ends. In this case, the control circuit 20 uses two switching phases $T_1$ and $T_2$, with $T_{SW}=T_1+T_2$, wherein:

during the phase $T_1$ ($T_1=T_{ON1}=T_{OFF2}$) the switch Q1 is closed and the switch/diode Q2 is opened; and during the phase $T_2$ ($T_2=T_{OFF1}=T_{ON2}$) the switch Q1 is opened and the switch/diode Q2 is closed.

Often, CCM uses a constant frequency PWM modulation. For example, in this case, the instant $t_1$ is started periodically after a constant time $T_{SW}$. Conversely, the instant $t_2$ may be determined as a function of the feedback signal FB and the reference signal $V_{ref}$, e.g.:

by using a PI or PID regulator configured to directly vary the duty cycle or the switch-on time $T_{ON1}$ in order to regulate the feedback signal FB to the reference signal $V_{ref}$, or by ending the switch-on interval $T_{ON1}$ when the current $I_L$ flowing through the inductance L (or a value indicative of this current) reaches a maximum threshold value, wherein a PI or PID regulator is configured to vary the maximum threshold value in order to regulate the feedback signal FB to the reference signal $V_{ref}$.

Conversely, in the low-power mode, the control circuit 22 may be configured to drive the switches in a burst mode. Specifically, in this case, the control circuit 22 is configured to alternatively close the electronic switches Q1 and Q2 for one or more cycles, and then both electronic switches are opened. Thus, in this case, the control circuit 20 uses (at least for the last burst) indeed three switching phases $T_1$, $T_2$ and $T_3$, with $T_{SW}=T_1+T_2+T_3$, wherein:

during the phase $T_1$ ($T_1=T_{ON1}$) the switch Q1 is closed and the switch/diode Q2 is opened;

during the phase $T_2$ ($T_2=T_{ON2}$) the switch Q1 is opened and the switch/diode Q2 is closed; and during the phase $T_3$ ($T_{OFF1}=T_2+T_3$ and $T_{OFF2}=T_3+T_1$) the switch Q1 is opened and the switch/diode Q2 is opened.

For example, as shown in FIG. 4B, the control circuit 22 may be configured to:

open the switch Q1 and close the switch Q2 at an instant $t_2$ after a constant switch-on time or after a switch-on time determined as a function of the feedback signal FB;

open the electronic switch Q2 preferably when the current $I_L$ reaches zero at an instant $t_3$, thereby reducing switching losses; and start a new switching cycle at an instant $t_1$ when the feedback signal FB reaches a lower threshold.

For example, the lower threshold may be determined as a function of the reference signal $V_{ref}$ being indicative of the requested output voltage $V_{out}$.

In general, also (usually fixed) dead times may be introduced between the switching of the drive signals, e.g. between the falling edge of the signal $DRV_1$ and the rising edge of the signal $DRV_2$, and similarly (in CCM mode) between the falling edge of the signal $DRV_2$ and the rising edge of the signal $DRV_1$. Insofar as these intervals are usually short compared to the durations $T_{ON}$ and $T_{OFF}$, these intervals will not be considered specifically in the following.

Thus, essentially, the burst mode may correspond to a special case of DCM, wherein the electronic switch Q2 is opened (and remains opened during the interval $T_3$) when the current $I_L$ reaches zero.

As shown in FIG. 5, for this purpose, the control circuit 22 may comprise or be connected to a zero current detection circuit 26 configured to generate a zero current signal ZC indicating (at least) the instant $t_3$ when the current $I_L$ reaches zero, in particular at least during the interval $T_2$. For example, such a zero current detection circuit 26 may comprise (or may be connected to) at least one of:

a current sensor 26a connected directly in series with the inductance L, wherein the current sensor 26a provides a signal CS1 indicative of (and preferably proportional to) the current $I_L$ flowing through the inductance L;

a current sensor 26b connected directly between the terminals 2002b and 200b, wherein the current sensor 26b provides a signal CS2 indicative of (and preferably proportional to) the current flowing through the ground line, which corresponds to the current $I_L$ flowing through the inductance L;

a current sensor 26c connected directly in series with the electronic switch Q2, wherein the current sensor 26c provides a signal CS3 indicative of (and preferably proportional to) the current flowing through the switch Q2, which corresponds to the current $I_L$ flowing through the inductance L during the interval $T_2$; or a voltage sensor providing a voltage $V_{Lx}$ indicative of (and preferably proportional to) the voltage between the switching node Lx and the terminal 200b/ground GND, i.e. the voltage at the electronic switch Q2, which is proportional to the current $I_L$ flowing through the switch-on resistance $R_{DSon}$ of the electronic switch Q2.

Thus, in general, any sensor providing a signal indicative of (and preferably proportional to) the current flowing (at least during the interval $T_2$) through the inductance L may be used. For example, such current sensors 24a, 24b or 24c may be implemented via a respective shunt resistor.

For example, the zero current signal ZC may be determined via a comparator 26, so called zero current comparator, e.g. configured to determine whether the monitored signal CS1, CS2, CS3 or $V_{Lx}$ falls below a given threshold (which is usually close to zero). For example, in FIG. 4B is shown an example of the zero current signal ZC, which is set to high when the measured current is smaller than the threshold (close to zero).

Thus, the logic level of the zero current signal ZC per se does not necessarily indicate that the current $I_L$ is indeed zero, but the signal ZC indicates (at least) the instant $t_3$ when the current $I_L$ reaches (approximately) zero, which is signaled by changing the logic level of the signal ZC, e.g. from low to high. Thus, in general, the zero current detection circuit 26 is configured to determine the instant $t_3$ when the current $I_L$ falls below a first threshold (at least during the interval $T_2$), and in response to detecting that the current $I_L$ falls below the threshold, to change the logic level of the zero current signal ZC from a first logic level (e.g. low) to a second logic level (e.g. high).

Similar issues exist also in other electronic converters comprising a switching stage with two electronic switches Q1/Q2 and an inductance L, wherein the electronic converter may be operated in high-power mode (in particular CCM) and a low-power mode (in particular DCM, preferably a burst mode). For example, this applies to various types of half-bridge converters, wherein the inductance L shown in FIG. 2 is replaced with a primary winding of a transformer. In this case, the output terminals are not connected to the capacitance Cout, but the secondary winding of the transformer is connected to the output terminal 202a and 202b via a rectifier and filter circuit. Other types of electronic converters which may be operated in CCM and DCM (in particular for the burst mode) are boost and buck-boost converters comprising two electronic switches.

For example, FIG. 6 shows an example of a boost converter. Specifically, in the example considered, an inductance L, such as an inductor, is connected (e.g. directly) between the positive input terminal 200a and a switching node Lx. The switching node Lx is connected (e.g. directly) via (the current path of) a first electronic switch Q1 to the negative input terminal 200b, which in turn is usually connected (e.g. directly) to the negative output terminal 202b. The switching node Lx is also connected (e.g. directly) via (the current path of) a second electronic switch Q2 to the positive output terminal 202a. For example, the electronic switches Q1 and Q2 may be MOSFETs. Usually a capacitance Cout, such as a capacitor, is connected between the output terminals 202a and 202b.

For example, in CCM, the control circuit 22 may again generate a PWM signal $DRV_1$ for the electronic switch Q1, wherein the duty cycle is determined, e.g. via PI or PID regulator, as a function of a feedback signal FB and a reference voltage $V_{ref}$. For example, again the feedback signal FB may be provided by a voltage sensor 24 configured to generate a feedback signal FB indicative of (and preferably proportional to) the output voltage $V_{out}$. The control circuit 22 may generate also a signal $DRV_2$ for the electronic switch Q2, which (again neglecting possible dead-times) corresponds to the inverted version of the signal $DRV_1$.

Conversely, in the burst mode/DCM, the control circuit 22 may be configure to:
- close the electronic switch Q1 (with Q2 opened) for a time $T_1$ (being constant or determined as a function of the feedback signal FB);
- close the electronic switch Q2 (with Q1 opened) for a time $T_2$, wherein the end of the interval $T_2$ is determined as a function of a zero current signal ZC; and
- maintain opened the electronic switches Q1 and Q2 for a time $T_3$, wherein a new switching cycle may start with constant frequency in DCM or as a function of the feedback signal FB in the burst mode, e.g. when the feedback signal FB indicates that the output voltage has reached a lower threshold.

The zero current signal ZC may again be provided by a zero current detection circuit 26 configured to monitor a signal CS indicative of (and preferably proportional to) the current $i_L$, e.g. provided by a current sensor 26b connected in between the terminals 200b and 202b.

Thus, in general, the control circuit 22 has to determine when to switch from the high-power mode (in particular CCM) to the low-power mode (burst mode/DCM). Typically, such a decision is based on the power requirements of the load 30, i.e. the power the electronic converter has to transfer from the input terminals 200a/200b to the output terminals 202a/202b.

SUMMARY

Embodiments provide a control circuit for an electronic converter, such as a buck converter, configured to monitor one or more operating parameters of the electronic converter in order to determine whether to switch from a High-Power Mode, in particular CCM, to a Low-Power Mode, in particular DCM, preferably a burst mode.

As mentioned before, various embodiments of the present disclosure relate to a control circuit for a switching stage of an electronic converter configured to provide via two output terminals an output voltage.

In various embodiments, the electronic converter comprises two input terminals for receiving an input voltage and two output terminals for providing an output voltage. A switching stage is connected between the two input terminals and the two output terminals, wherein the switching stage comprises an inductance, and a first electronic switch and a second electronic switch configured to control a current flowing through the inductance. A feedback circuit is configured to provide a first feedback signal proportional to the output voltage, and a measurement circuit is configured to provide a second feedback signal proportional to the current flowing through the inductance. For example, the electronic converter may be a buck, boost, buck-boost or half-bridge converter.

Accordingly, in various embodiments, the control circuit is configured to generate the drive signals for the first and second electronic switch as a function of the first feedback signal and the second feedback signal. In various embodiments, the control circuit comprises thus a first drive terminal configured to provide a first drive signal to the first electronic switch of the switching stage, a second drive terminal configured to provide a second drive signal to the second electronic switch of the switching stage, a first feedback terminal configured to receive from the feedback circuit the first feedback signal proportional to the output voltage, and a second feedback terminal configured to receive from the measurement circuit the second feedback signal proportional to a current flowing through an inductance of the switching stage.

In various embodiments, the control circuit also comprises a zero current detector and a driver circuit. Specifically, in various embodiments, the zero current detector is configured to detect whether the second feedback signal falls below a given threshold value (which is close to zero), and in response to detecting that the second feedback signal falls below the given threshold value, change the logic level of a zero current signal from a first logic level to a second logic level.

In various embodiments, the driver circuit is configured to generate the first drive signal and the second drive signal, wherein the driver circuit is configured to switch from a high-power mode to a low-power mode as a function of a control signal. Specifically, in various embodiments, the driver circuit is configured to repeat, in the high-power mode, the following switching phases for each switching cycle of a sequence of switching cycles:
- for a first phase, close the first electronic switch and open the second electronic switch, and
- for a following second phase, open the first electronic switch and close the second electronic switch, For example, the driver circuit may be configured to determine the duration of the first phase and/or the second phase as a function of the first feedback signal.

Conversely, in various embodiments, the driver circuit is configured to repeat, in the low-power mode, the following switching phases for each switching cycle of a sequence of switching cycles:
- for a first phase, close the first electronic switch and open the second electronic switch,
- for a following second phase, open the first electronic switch and close the second electronic switch, and
- for a following third phase, open the first electronic switch and open the second electronic switch, Specifically, in various embodiments, the driver circuit is configured to detect when the logic level of the zero current signal changes from the first logic level to the second logic level, and end the second phase in response to detecting that the logic level of the zero current signal changes from the first logic level to the second logic level. Moreover, the driver circuit may be configured to determine the duration of the first phase and/or the third phase as a function of the first feedback signal.

Accordingly, in various embodiments, the high-power mode is a Continuous-Conduction Mode and the low-power mode is a Discontinuous-Conduction Mode, preferably a burst mode.

In various embodiments, the control circuit comprises also a low-power detection circuit configured to generate the control signal. Specifically, in various embodiments, the low-power detection circuit is configured to, when the driver circuit operates in the high-power mode, determine a first value indicative of the duration of the second phase. Moreover, the low-power detection circuit is configured to detect whether the logic level of the zero current signal changes from the first logic level to the second logic level during the second phase, and in response to detecting that the logic level of the zero current signal changes from the first logic level to the second logic level, determine a second value indicative of the time elapsed between the instant when the logic level of the zero current signal changes from the first logic level to the second logic level during the second phase and the instant when the second phase ends. Next, the low-power detection circuit may determine whether the ratio between the second value and the first value is greater than a given threshold value. In response to determining that the ratio between the second value and the first value is smaller than the given threshold value, the low-power detection circuit may set a comparison signal to a first logic level indicating that the high-power mode should be maintained. Conversely, in response to determining that the ratio between the second value and the first value is greater than the given threshold value, the low-power detection circuit may set the comparison signal to a second logic level indicating that the low-power mode should be activated. Accordingly, the low-power detection circuit may set the logic level of the control signal as a function of the comparison signal.

For example, the control signal may correspond to the comparison signal, or the low-power detection circuit may be configured to increase a count value when the comparison signal is set to the second logic level, and set the control signal to a given logic level indicating that the low-power mode should be activated when the count value reaches a respective count threshold value.

For example, in order to implement the above operation, the low-power detection circuit may comprise a first analog ramp generator configured to generate a first ramp signal with a first slope, a second analog ramp generator configured to generate a second ramp signal with a second slope, and an analog comparator and sampling circuit configured to generate the comparison signal by comparing the first ramp signal with the second ramp signal in response to a sampling signal. Accordingly, a control circuit of the low-power detection circuit may activate the first analog ramp generator at the instant when the second phase starts and activate the second analog ramp generator at the instant when the logic level of the zero current signal changes from the first logic level to the second logic level during the second phase. Moreover, the control circuit of the low-power detection circuit may set the sampling signal at the instant when the second phase ends. Accordingly, in this case, the ratio between the first slope and the second slope corresponds to the given threshold value.

For example, the first analog ramp generator and/or the second analog ramp generator may comprises an analog integrator. Such an analog integrator may comprise an integration capacitor wherein the voltage at the integration capacitor corresponds to the respective first or second ramp signal, a current generator configured to provide a current used to charge the integration capacitor, and an electronic switch configured to selectively short circuit the integration capacitor when the analog integrator is deactivated, thereby discharging the integration capacitor.

Conversely, in a digital implementation, the low-power detection circuit may comprise a first digital counter configured to increase a first count value by a first increment value in response to a first clock signal, a second digital counter configured to increase a second count value by a second increment value in response to a second clock signal, and a digital comparator and sampling circuit configured to generate the comparison signal by comparing the first count value with the second count value in response to a sampling signal. Accordingly, in this case, a control circuit of the low-power detection circuit may be configured to activate the first counter at the instant when the second phase starts and activate the second counter at the instant when the logic level of the zero current signal changes from the first logic level to the second logic level during the second phase. Moreover, the control circuit of the low-power detection circuit may set the sampling signal at the instant when the second phase ends. Accordingly, in this case, the ratio between the first increment value and the second increment value and/or the ratio between the frequency of the first clock signal and the frequency of the second clock signal define the given threshold value. For example, the frequency of the first clock signal may correspond to the frequency of the second clock signal, whereby the ratio between the first increment value and the second increment value corresponds to the given threshold value. Alternatively, the first increment value may correspond to the second increment value, whereby the ratio between the frequency of the first clock signal and the frequency of the second clock signal corresponds to the given threshold value.

In various embodiments, the first slope and/or the second slope are programmable. Similarly, the ratio between the first increment value and the second increment value and/or the ratio between the frequency of the first clock signal and the frequency of the second clock signal may be programmable.

Accordingly, in order to operate the electronic converter, the zero current signal may be generated via the zero current detector as a function of the second feedback signal. Moreover, the first drive signal and the second drive signal may be generated via the driver circuit as a function of the first feedback signal, the zero current signal and the control signal. Finally, the control signal may be generated via the low-power detection circuit as a function of the zero current signal and the given threshold value.

In various embodiments, the given threshold value of the low-power detection circuit is determined, e.g. during a design phase, as a function of a requested percentage of the average value of the current flowing through the inductance when the electronic converter operates in the boundary condition between the Continuous-Conduction Mode and the Discontinuous-Conduction Mode.

BRIEF DESCRIPTION OF THE DRAWINGS

The features and advantages of the present invention will become apparent from the following detailed description of practical embodiments thereof, shown by way of non-limiting example in the accompanying drawings, in which:

FIG. 1 shows an example of an electronic converter;

FIG. 2 shows an example of a buck converter;

FIG. 3 shows typical waveforms of the buck converter of FIG. 2;

FIGS. 12A and 12B show examples of waveforms of the current flowing through the inductance of the converter of FIG. 7;

DETAILED DESCRIPTION OF ILLUSTRATIVE EMBODIMENTS

In the ensuing description, various specific details are illustrated aimed at enabling an in-depth understanding of the embodiments. The embodiments may be provided without one or more of the specific details, or with other methods, components, materials, etc. In other cases, known structures, materials, or operations are not shown or described in detail so that various aspects of the embodiments will not be obscured.

Reference to "an embodiment" or "one embodiment" in the framework of this description is meant to indicate that a particular configuration, structure, or characteristic described in relation to the embodiment is comprised in at least one embodiment. Hence, phrases such as "in an embodiment", "in one embodiment", or the like that may be present in various points of this description do not necessarily refer to one and the same embodiment. Moreover, particular conformations, structures, or characteristics may be combined in any adequate way in one or more embodiments.

The references used herein are only provided for convenience and hence do not define the sphere of protection or the scope of the embodiments.

In FIGS. 7 to 18 described below, parts, elements or components that have already been described with reference to FIGS. 1 to 6 are designated by the same references used previously in these figures. The description of these elements has already been made and will not be repeated in what follows in order not to burden the present detailed description.

Figure 7:
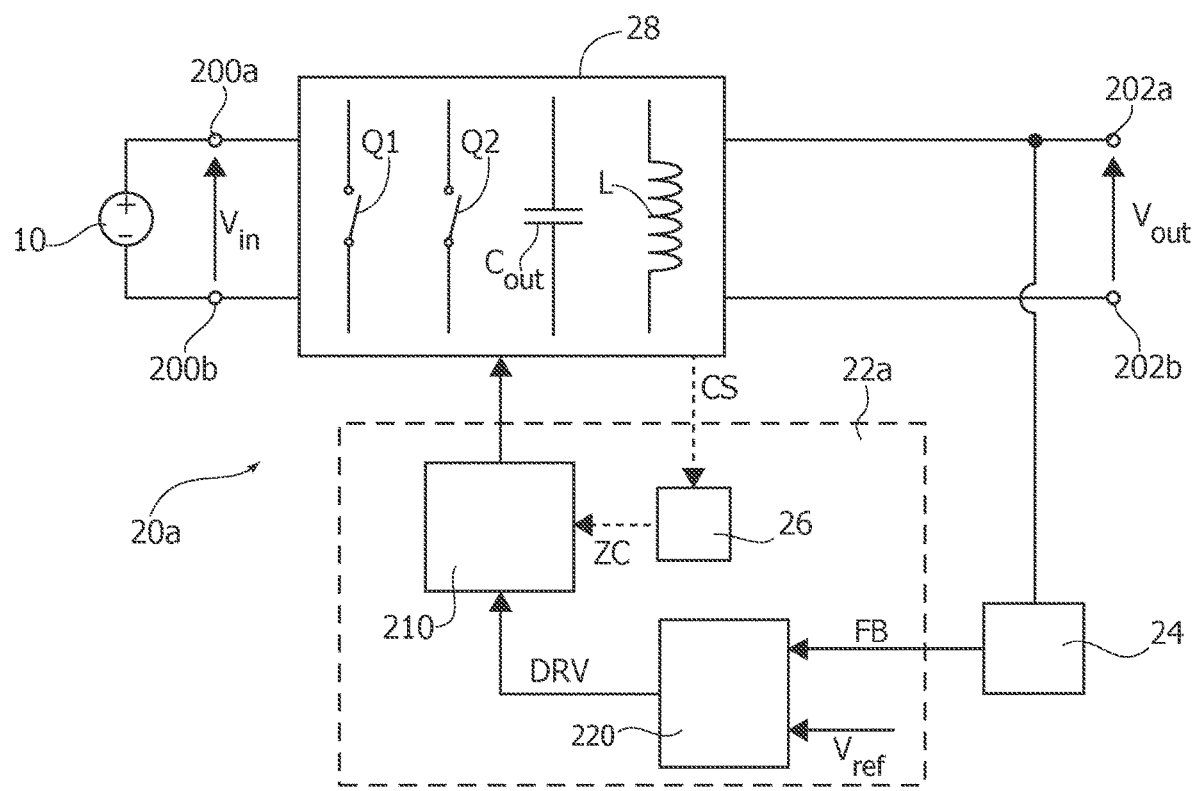
FIG. 7 shows an embodiment of an electronic converter comprising an inductance which may be operated in CCM and DCM.

As mention before, various embodiments of the present disclosure relate to a control circuit 22a for an electronic converter 20a adapted to operate in CCM and DCM. FIG. 7 shows a first embodiment of a control circuit 22a for an electronic converter 20a, such as a buck or boost converter. For a general description of such converters, reference may be made to the description of FIGS. 1 to 6.

In the embodiment considered, the electronic converter 20a comprises a switching stage/circuit 28 connected between input terminals 200a, 200b and output terminal 202a, and 202b. Such a switching stage 28 comprises at least one inductance L, such as an inductor or transformer, and at least two electronic switches Q1 and Q2 configured to control the current $I_L$ flowing through the inductance L. Optionally the switching stage 28 comprises also at least one capacitor Cout. For example, in a buck converter (FIG. 2) or boost converter (FIG. 6), these components are the electronic switch Q1, the electronic switch Q2, the inductance L and the capacitance Cout.

As described in the foregoing, the switching stage 28 is configured such that the current flowing through the inductance L may be controlled selectively (via the electronic switches Q1 and Q2) in CCM or DCM, preferably for use in a burst mode.

Figure 4A:
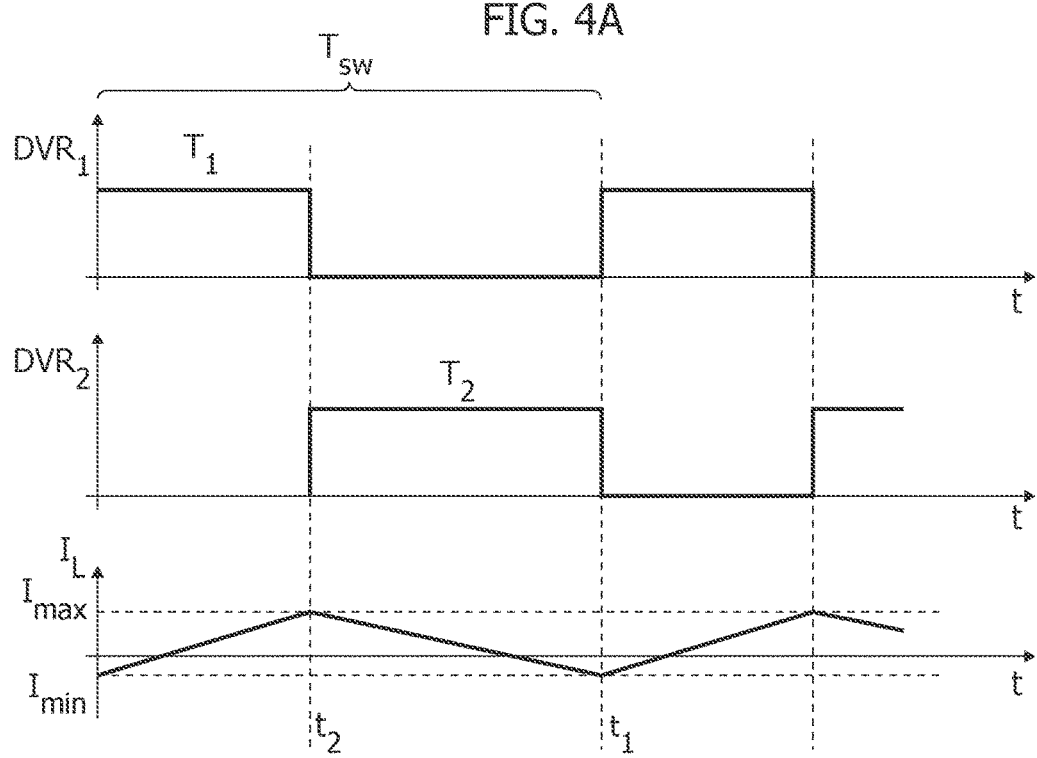
FIGS. 4A and 4B show exemplary waveforms when the converter is operated in CCM and DCM, respectively.

For example, as shown in FIG. 4A, in CCM, the control circuit 22a uses two switching phases $T_1$ and $T_2$, with $T_{SW}=T_1+T_2$, wherein:

during the phase $T_1$ ($T_1=T_{ON1}=T_{OFF2}$) the switch Q1 is closed and the switch Q2 is opened; and during the phase $T_2$ ($T_2=T_{OFF1}=T_{ON2}$) the switch Q1 is opened and the switch Q2 is closed.

Figure 4B:
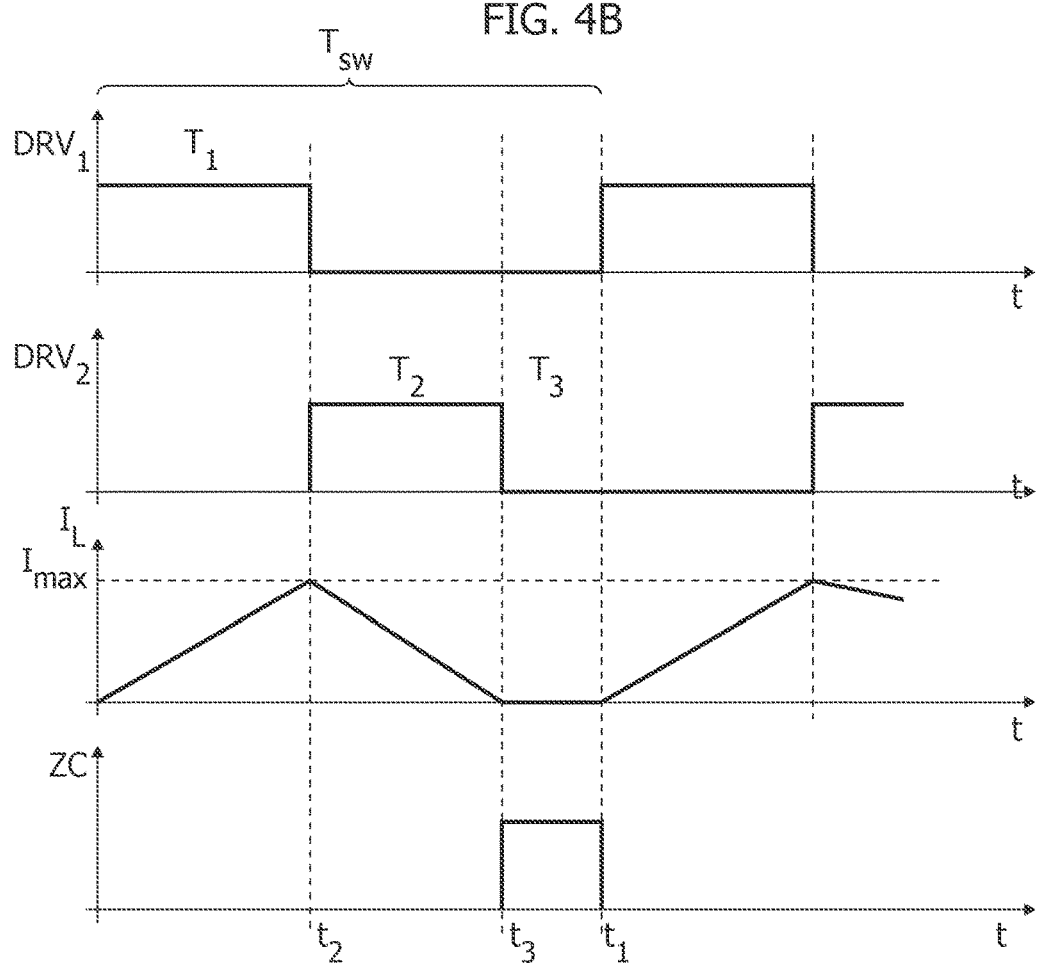
Figure 5:
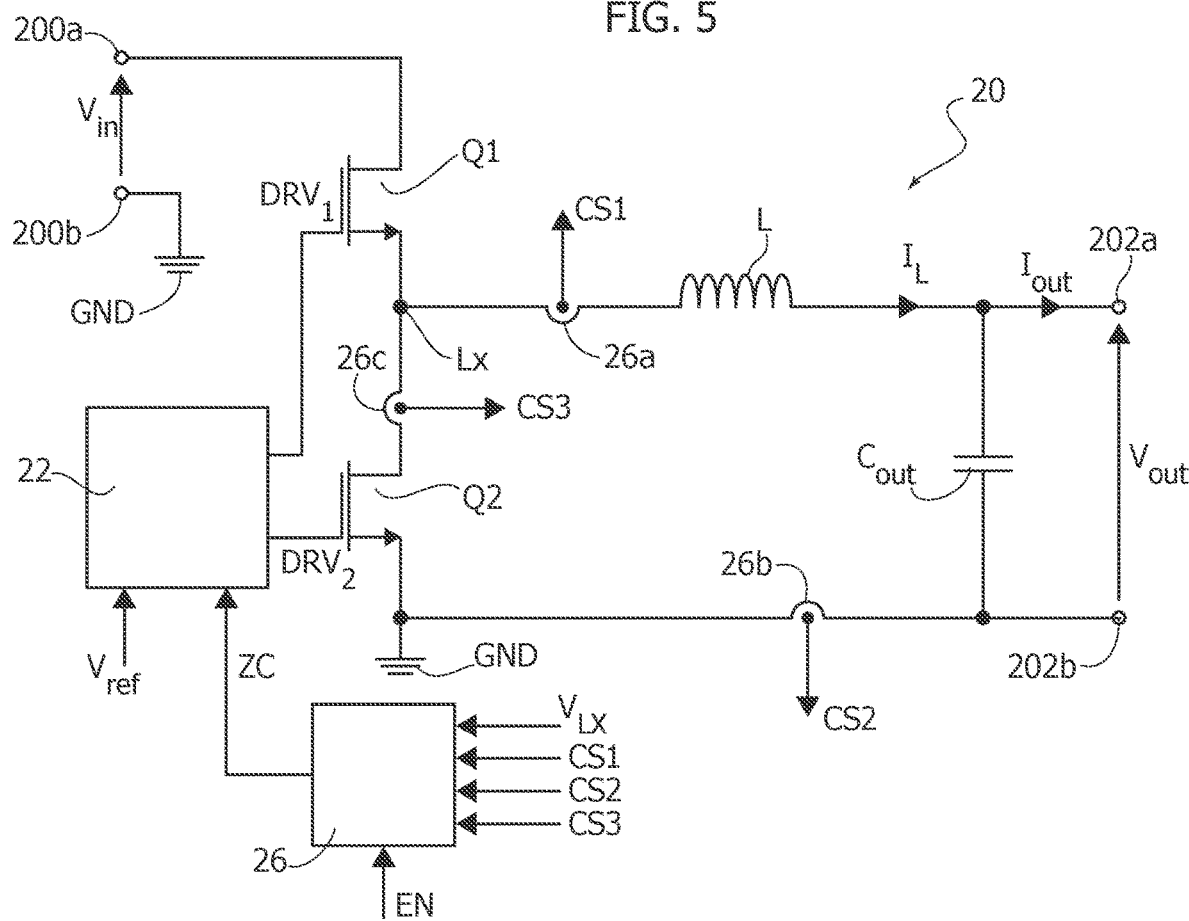
FIG. 5 shows an example of the control circuit of a buck converter adapted to drive the converter in CCM and DCM.
Figure 6:
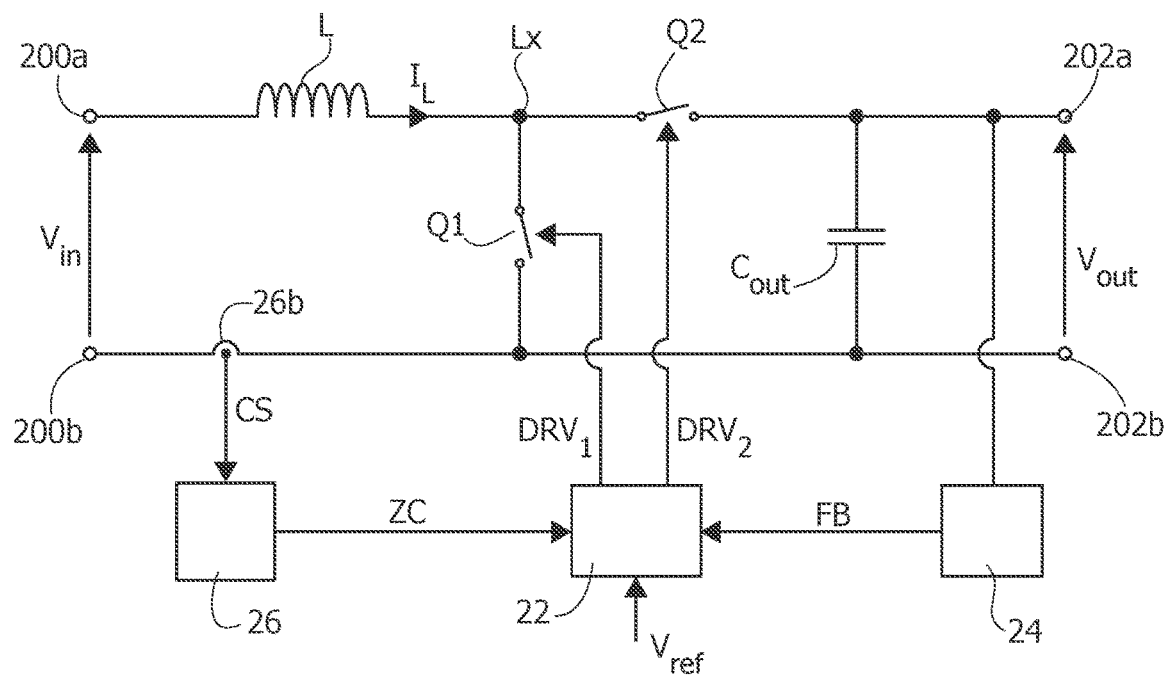
FIG. 6 shows an example of a boost converter.

Conversely, as shown in FIG. 4B, in DCM, the control circuit 20 uses three switching phases $T_1$, $T_2$ and $T_3$, with $T_{SW}=T_1+T_2+T_3$, wherein:

during the phase $T_1$ ($T_1=T_{ON1}$) the switch Q1 is closed and the switch Q2 is opened;

during the phase $T_2$ ($T_2=T_{ON2}$) the switch Q1 is opened and the switch Q2 is closed; and during the phase $T_3$ ($T_{OFF1}=T_2+T_3$ and $T_{OFF2}=T_3+T_1$) the switch Q1 is opened and the switch Q2 is opened.

Generally, it is not particularly relevant for the embodiments described herein how these phases are managed. In fact, the present disclosure mainly relates to solutions for determining when the control circuit 22a should switch from a High-Power Mode (HPM), in particular CCM, to a Low-Power Mode (LPM), in particular DCM, preferably a burst mode.

For example, as described in the foregoing, in CCM, the duration of the switching cycle $T_{SW}$ may be constant and the switch-on duration $T_{ON1}$ may be determined via a PI or PID regulator configured to regulate the difference between a reference signal $V_{ref}$ and a feedback signal FB provided by a feedback circuit 24, wherein the feedback signal FB is indicative of the output voltage $V_{out}$ between the terminals 202a/202b.

Figure 8:
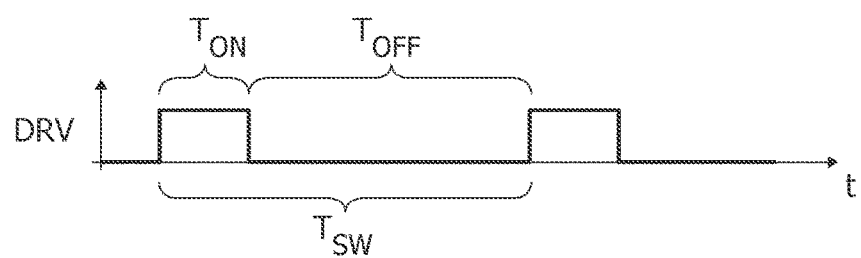
FIG. 8 shows and embodiment of a drive signal used in the electronic converter of FIG. 7.

For example, this is schematically shown via a PWM generator circuit 220 configured to generate a PWM signal DRV, which has switching cycles $T_{SW}$ (e.g. with fixed or predetermined period) wherein the signal DRV is set to a first logic level (e.g. high) for a first duration $T_{ON}$ and to a second logic level (e.g. low) for a second duration $T_{OFF}$, with $T_{SW}=T_{ON}+T_{OFF}$ (see also FIG. 8). For example, the circuit 220 may be an analog and/or digital PI or PID regulator configured to vary the switch-on duration $T_{ON}$ in order to regulate the difference between the reference signal $V_{ref}$ and the feedback signal FB to zero.

Accordingly, in this case, a driver circuit 210 may be configured to detect rising and falling edges in the drive signal DRV, and in response to a rising edge in the drive signal DRV, set (e.g., immediately) the signal $DRV_2$ for the electronic switch Q2 to low and set (e.g., after a first dead time) the signal $DRV_1$ for the electronic switch Q1 to high; and in response to a falling edge in the drive signal DRV, set (e.g., immediately) the signal $DRV_1$ to low and set (e.g., after a second dead time) the signal $DRV_2$ to high.

Conversely, in DCM, the control circuit 22a has also to determine the instant $t_3$ when the current $I_L$ flowing through the inductance L reaches zero. For example, for this purpose, the driver circuit 210 may receive a zero current signal ZC, e.g. determined as a function of a signal CS indicative of the current flowing through the inductance L. For example, in various embodiments, the control circuit 22a may comprise or be connected to a zero current detection circuit 26, such as a zero current comparator, configured to generate the zero current signal ZC as a function of a signal CS indicative of (and preferably proportional to) the current flowing through the inductance L.

Generally, it is not particularly relevant how the low-power mode is managed. For example, in the simplest case, the DCM mode could use the PWM signal DRV provided by the PWM generator circuit 220. For example, in this case, the driver circuit 210 may be configured to detect rising and falling edges in the drive signal DRV and detect the edge in the zero current signal ZC indicating the instant $t_2$, such as a rising edge, and:

in response to a rising edge in the drive signal DRV, set (immediately or after a first dead time) the signal $DRV_1$ to high;

in response to a falling edge in the drive signal DRV, set (e.g., immediately) the signal $DRV_1$ to low and set (e.g., after a second dead time) the signal $DRV_2$ to high; and in response to detecting the edge in the zero current signal ZC, set (e.g., immediately) the signal $DRV_2$ to low.

However, the driver circuit 210 may also be configured to use a separate burst mode. For example in this case, the driver circuit 210 may be configured to monitor the feedback signal FB and detect the edge in the zero current signal ZC indicating the instant $t_2$, such as a rising edge, and:

in response to detecting that the feedback signal FB falls below a given lower threshold, set (e.g., immediately) the signal $DRV_1$ to high;

after a given constant or variable time $T_{ON}$, set (e.g., immediately) the signal $DRV_1$ to low and set (e.g., after a second dead time) the signal $DRV_2$ to high; and in response to detecting the edge in the zero current signal ZC, set (e.g., immediately) the signal $DRV_2$ to low.

Figure 9:
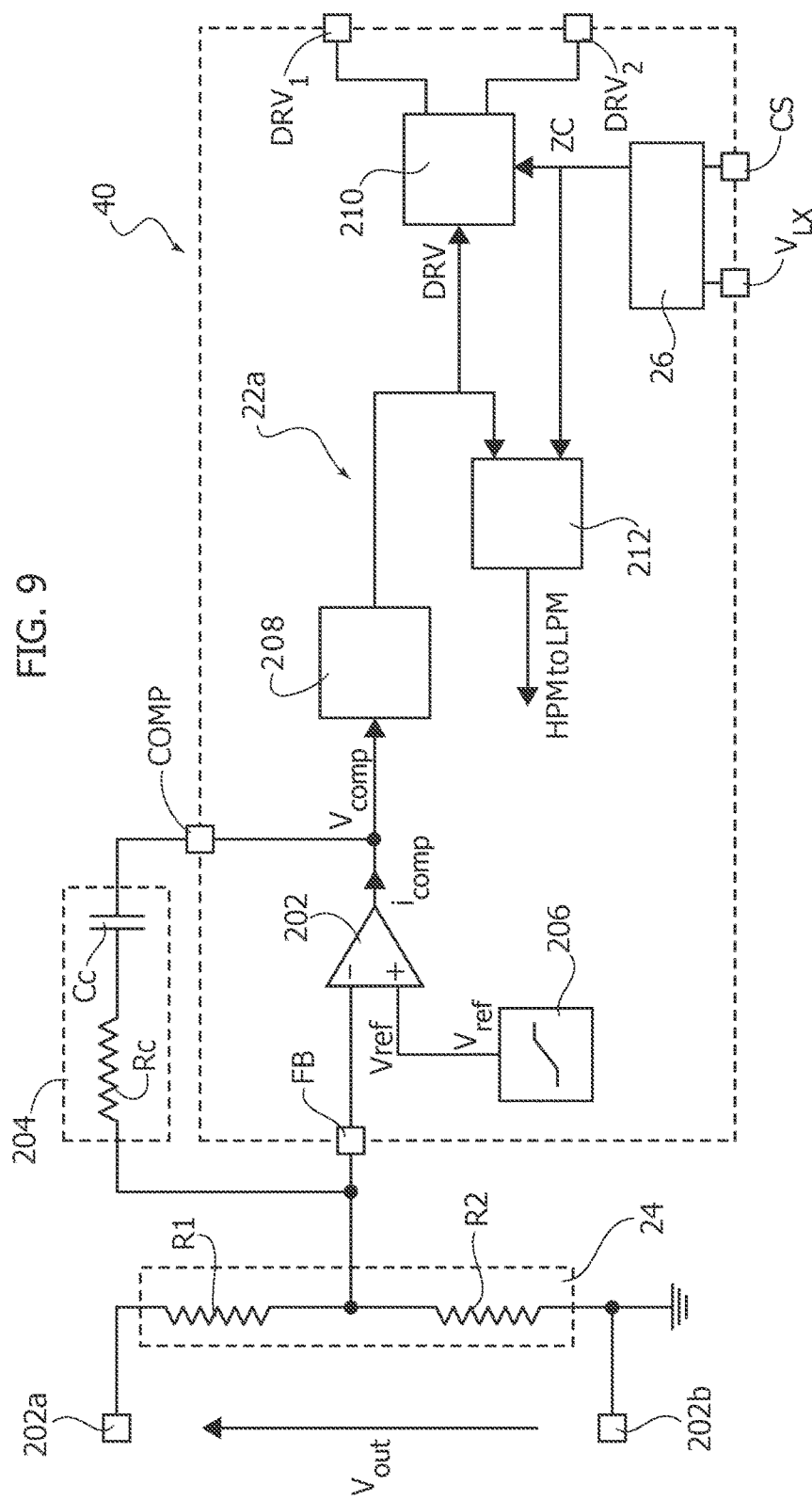
FIG. 9 shows an embodiment of a control circuit comprising an error amplifier, a pulse generator, a zero-current detector, a driver circuit and a low-power detection circuit.

FIG. 9 shows an embodiment of the control circuit 22a. For example, such a control circuit 22a may be implemented in an integrated circuit 40, e.g. the integrated circuit 40 may comprise:

a pad (of a respective die) or pin (of a respective integrated circuit package) configured to be connected to the feedback circuit 24, such as a voltage divider comprising two or more resistors R1 and R2 connected in series between the output terminals 202a and 202b, whereby the feedback signal FB is a voltage proportion to the output voltage $V_{out}$;

a pad/pin for providing the drive signal $DRV_1$ to the electronic switch Q1 and a pad/pin for providing the drive signal $DRV_2$ to the electronic switch Q2, e.g. to the gate terminals of respective FETs;

the control circuit 22a.

In general, the integrated circuit 40 may also comprise other elements, such as (at least part of) the zero current detection circuit 26, e.g. a respective zero current comparator, and/or the electronic switches Q1 and/or Q2.

Specifically, in the embodiment considered, the control circuit 22a comprises an error amplifier configured to generate an error signal $V_{comp}$ by comparing the feedback signal FB with a reference signal, such as a reference voltage $V_{ref}$.

In various embodiments, the reference voltage $V_{ref}$ may also be provided by a soft-start circuit 206 configured to increase, in response to a power-on of the control circuit 22a, the reference voltage $V_{ref}$ from a minimum value (e.g. 0 V) to a maximum value (corresponding to the nominal value of the reference voltage $V_{ref}$).

For example, in the embodiment considered, the error amplifier is implemented with an operational amplifier 202 and a compensation/feedback network 204 associated with the operational amplifier 202. For example, in the embodiment considered, the feedback signal FB is connected to the inverting/negative input of the operational amplifier 202 and the reference voltage $V_{ref}$ is connected to the non-inverting/positive input terminal of the operational amplifier 202. For example, the compensation network 204 may be connected between the output of the operational amplifier 202 and the feedback terminal (e.g. the inverting input of the operational amplifier 202) and/or ground GND, which as mentioned before may correspond to the terminal 200b and/or 202b.

Specifically, in various embodiments, the compensation network 204 comprises at least one capacitor Cc (integral component) and/or at least one resistor Rc (proportional component). For example, in the embodiment considered, a resistor Rc and a capacitor Cc are connected in series between the feedback terminal and the output of the operational amplifier 202. Specifically, in the embodiment considered, the operational amplifier 202 provides a current $i_{comp}$ as a function of the difference between the reference voltage $V_{ref}$ and the feedback signal FB, and the compensation network 204, e.g. via the resistor Rc and/or the capacitor Cc, is configured to convert the current $i_{comp}$ into the error signal/voltage $V_{comp}$. Accordingly, in the example considered, the error amplifier 202/204 is configured as regulator comprising an I (Integral) and a P (Proportional) component.

In general, the compensation network 204 may be integrated in or may be external to the integrated circuit 40. For example, in the example considered, the integrated circuit 40 comprises a pin/pad COMP connected to the output of the operational amplifier 202, and the compensation network 204 may be connected (e.g. externally) between the pin/pad COMP and ground GND.

In the embodiment considered, the error signal $V_{comp}$ is provided to a pulse generator circuit 208, such as a PWM generator circuit, configured to generate a binary/pulsed signal DRV, which is alternatively set to a first logic level (e.g. high) and a second logic level (e.g. low) for respective durations $T_{ON}$ and $T_{OFF}$. Specifically, the pulse generator circuit 208 is configured to vary at least one of the durations $T_{ON}$ and $T_{OFF}$ as a function of the error signal $V_{comp}$.

In the embodiment considered, the binary/pulsed signal DRV is provided to a driver circuit 210 configured to generate the drive signal $DRV_1$ and $DRV_2$ as a function of the drive signal DRV and the zero current signal ZC.

Figure 10:
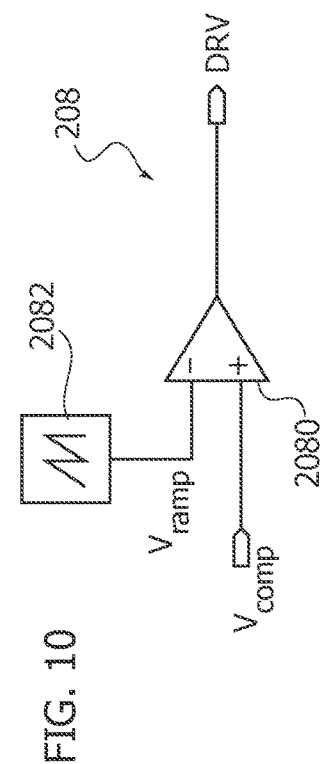
FIG. 10 shows an embodiment of the pulse generator circuit of FIG. 9.

FIG. 10 shows a possible embodiment of the pulse generator circuit 208. Specifically, in the embodiment considered, the pulse generator circuit 208 is a fixed frequency PWM generator circuit, i.e. the signal DRV has a constant switching frequency ($T_{SW}=T_{ON}+T_{OFF}$) and a variable duty cycle ($D=T_{ON}/T_{SW}$).

Specifically, in the embodiment considered, the error signal $V_{ramp}$ is provided to an input (e.g. the positive input terminal) of a comparator 2080 configured to determine whether the error signal $V_{comp}$ is smaller or greater than a ramp signal $V_{ramp}$ provided by a ramp generator 2082. Accordingly, by using the signal at the output of the comparator 2080 (possibly stabilized via a latch or flip-flop) as drive signal DRV, the signal DRV is set to high with a fixed frequency (determined by the frequency of the ramp signal $V_{ramp}$), and the duty cycle of the drive signal DRV is proportional to the amplitude of the error signal $V_{comp}$.

Accordingly, in the embodiment considered, the blocks 202, 204, 206 and 208 implement the PWM generator circuit 220 of FIG. 8.

As mentioned before, the driver circuit 210 may be configured to selectively operate the electronic converter in high-power mode (in particular CCM) or a low power mode (in particular DCM, preferably a burst mode). Accordingly, in various embodiments, the control circuit 22a has to decide whether to switch from CCM to DCM. For this purpose, the control circuit 22a comprises a low-power management/detection circuit 212 configured to generate a signal HPM-toLPM indicating whether the low-power mode should be activated. In various embodiments, this block may also be incorporated in the pulse generator circuit 208 or the driver circuit 210.

Figure 11:
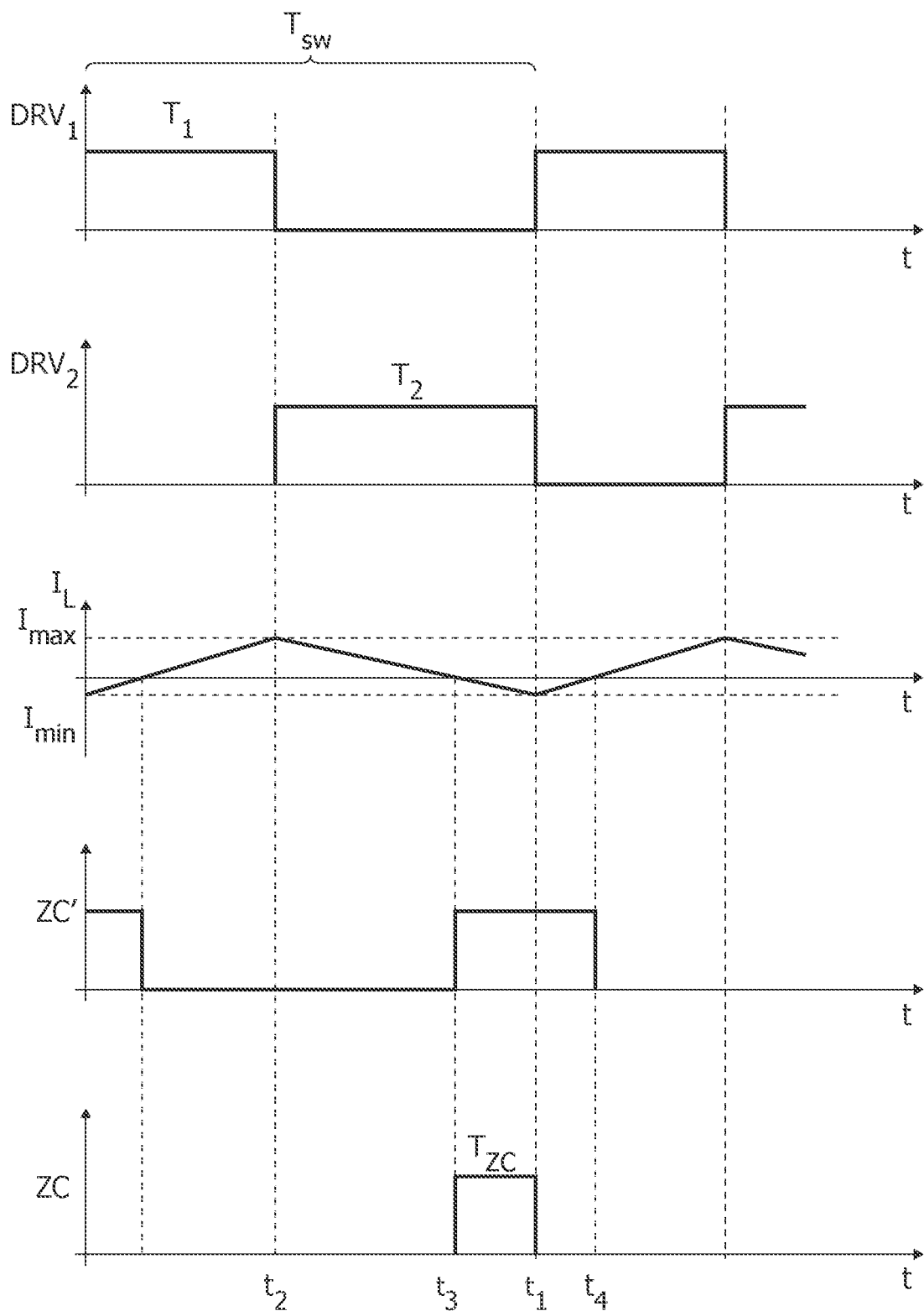
FIG. 11 shows an embodiment of the operation of the zero-current detector of FIG. 9.

Specifically, as also shown in FIG. 4A, the switching stage 28 is typically operated in CCM at higher loads. However, as also shown in FIG. 11, when the load decreases in CCM, the current $I_L$ flowing through the inductance L will be negative at the end of the interval $T_2$. Specifically, in this case, the current $I_L$ will become negative at an instant $t_3$ (during the interval $T_2$) and positive at an instant $t_4$ (during the interval $T_1$).

FIG. 11 also shows in this respect possible embodiments of the zero current signal ZC. For example, FIG. 11 shows a first zero current signal ZC', wherein the zero current detection circuit 26 is configured to determine the instant when the current $I_L$ falls below a first threshold (instant $t_3$) and to determine the instant when the current $I_L$ exceeds a second threshold (instant $t_4$), wherein the second threshold is equal to or greater than the first threshold. For example, in this case the zero current detection circuit 26 may be implemented with a comparator or comparator with hysteresis.

However, FIG. 11 shows also a second example of a zero current signal ZC, wherein the zero current signal ZC changes again the logic level at the instant $t_1$. For example, this may be an inherent characteristic of the signal ZC due to the properties of the current sensor, which e.g. could be only operative during the interval T2.

Additionally or alternatively, the zero current detection circuit 26 may be configured to combine the previously described signal ZC' with an enable signal EN (see also FIG. 5) indicating the instant $t_1$ when the next switching cycle starts. For example, the enable signal EN may be generated as a function of one of the drive signals DRV or $DRV_1$, or the voltage $V_{LX}$ at the switching node Lx. In this case, the zero current detection circuit 26 may be configured to determine the instant $t_1$ (when the electronic switch Q1 is closed) as a function of the enable signal EN, and, in response to detecting the instant $t_1$, change the logic level of the zero current signal ZC from the second logic level (e.g. high) to the first logic level (e.g. low).

Accordingly, when the zero current signal ZC is set in CCM, this provides an indication that DCM could be used instead of CCM.

Thus, in a first solution, in order to determine whether to switch from the high-power mode to the low-power mode, the control circuit 22a may be configured to monitor the signal ZC, in particular in order to determine whether the signal ZC is set before a new switching cycle starts at the instant $t_1$, e.g. by determining whether the signal ZC is set (e.g. to high) at the end of the switching cycle, which indicates a null or negative current in the inductance L at the end of the switching cycle. For example, when the signal ZC is set in CCM at the end of the switching cycle, the control circuit 22a may switch from CCM to the low-power mode. For stability reasons, it may be useful to not switch immediately, but determine whether the signal ZC was set or not set for a given number of switching cycles before switching from CCM to DCM.

However, the inventors have observed that this solution may be extremely sensitive to the precision of the zero current comparator 26. For example, such a comparator 26 may have an offset, which at low (positive) values of the current $I_L$ may trigger, thereby activating the low power/DCM mode too early, resulting in a higher average current in the inductance L. Moreover, as will also be described in greater detail in the following, such a switching from CCM to DCM when the minimum value of $I_L$ is greater than zero, requires a new regulation point, which may cause the control circuit 22a to go into a loop, wherein the converter is switched continuously between LPM and HPM.

In order to avoid this problem, in a second solution, the low-power detection circuit 212 may also directly monitor the current $I_L$, e.g. by monitoring the signal $CS/V_{Lx}$ received by the zero current comparator 26. Accordingly, in this case, the driver circuit 210 may switch from CCM to DCM when the value of the current $I_L$ falls below a given (negative) threshold at the end of the switching cycle $T_{SW}$. Substantially, this solution requires an additional comparator. However, also this solution is not particularly precise, because the slope of the current $I_L$ depends on the operating parameters of the electronic converters 20a, such as the input voltage $V_{in}$, the output voltage $V_{out}$, the inductance L, and the duration of a switching cycle $T_{SW}$. This may even lead to situations, in which the current $I_L$ never reaches the negative threshold value.

Thus, in a third solution, the low-power detection circuit 212 may also monitor the average value of the current $I_L$ and compare the same with a given (negative) current threshold. However, also this solution is not precise, because the power supplied to the load depends also in this case on other parameters, such as the input voltage $V_{in}$ and the output voltage $V_{out}$. For example, in order to correctly determine the power managed by the converter, the driver 210 should also measure the value of the input voltage $V_{in}$. However, this solution is complex and expansive.

In the following will now be described a low complexity solution which permits to overcome the above drawbacks.

FIGS. 12A and 12B show in this respect exemplary waveforms of the current $I_L$ flowing through the inductance L and the zero current signal ZC when the control circuit 22a operates the switching stage 28 in CCM. Generally, as mentioned before, in CCM, the switching cycle $T_{SW}$ comprises a first phase $T_1$ where the current usually increments (substantially) linearly, and a second phase $T_2$ where the current usually decreases (substantially) linearly (neglecting possible dead-times).

Specifically, FIG. 12A shows two exemplary waveforms 100 and 102 for the current $I_L$ in the boundary condition/TM operation, i.e. when the current $I_L$ exactly reaches zero when a new switching cycle is started. Specifically, the boundary condition/TM operation represents the limit when DCM could be used instead of CCM.

Specifically, assuming the duration of the switching cycle $T_{SW}$ is constant, the gradient and thus the peak value of the current $I_L$ during the phase $T_1$ mainly depends on the value of the input voltage $V_{in}$, the output voltage $V_{out}$, and the inductance L. Accordingly, the average current $I_L$ in the boundary condition ($I_{Bound}$) changes based on this operating conditions of the converter, which renders the solutions using only the average current not very precise.

Conversely, FIG. 12B shows two exemplary waveforms 104 and 106 for the current $I_L$ when the average current flowing through the inductance is zero.

Also in this case, assuming the duration of the switching cycle $T_{SW}$ is constant, the gradient and thus the peak value of the current $I_L$ during the phase $T_1$ mainly depends on the value of the input voltage $V_{in}$ the output voltage $V_{out}$, and the inductance L. However, in this case, the current $I_L$ is 50% positive and 50% negative in each switching cycle $T_{SW}$, as schematically shown via a zero current signal ZC having a duration equal to half of phase $T_2$.

Accordingly, in general, DCM (e.g. a burst mode) may be used between these two extreme cases, i.e. between the boundary condition and the "zero-average-current" condition.

In general, it may be observed that once the boundary condition is exceeded, the current $I_L$ will be negative at the end of the interval $T_2$ and the zero current signal ZC will be set at an instant $t_3$ before the start of the next switching cycle $T_{SW}$ at the next instant $t_1$. Specifically, by defining as time $T_{ZC}$ the time between the instant $t_3$ when the signal ZC is set and the instant $t_1$ when the next switching cycle starts (e.g., when the signal ZC is reset), i.e. $T_{ZC}=t_1-t_3$, it may be observed that:

the time $T_{ZC}$ is zero in the boundary condition (FIG. 12A); and the time $T_{ZC}$ is 50% of the period $T_2$ when the average current is zero (FIG. 12B).

Thus, in various embodiments, the control circuit 22a, e.g. the driver circuit 210, is configured to determine the times $T_{ZC}$ and $T_2$ (or values indicative for these times) and determine whether the ratio $(T_{ZC}/T_2)$ is greater than a given threshold value TH, i.e.:

$$T_{ZC}/T_2 > TH, \text{ i.e. } T_{ZC} > TH \times T_2 \qquad (1)$$

where the threshold TH is between 0 and 0.5 and represents a scaling coefficient for the time $T_2$, i.e.:

$$0 < TH < 0.5 \qquad (2)$$

For example, in various embodiments the threshold TH is between 0.01 and 0.3, preferably between 0.05 and 0.25.

For example, in various embodiments the threshold value TH may be selected as a function of the average boundary current $I_{Bound}$ in the boundary condition, which as mentioned before changes based on the operating conditions of the converter (FIG. 12A). Specifically, the average current $I_{Bound}$ in the boundary condition with a peak current $I_{max,B}$ may be calculates as a function of the peak value $I_{max,B}$, i.e.:

$$I_{Bound}=I_{max,B}/2 \qquad (3)$$

Conversely, when the current is negative at the end of the interval the average $I_{Av}$ current may be calculated as:

$$I_{Av}=I_{ripple}/2 \times (1-2 \times T_{ZC}/T_2) \qquad (4)$$

where $I_{ripple}$ is the amplitude of the ripple in the current $I_L$, i.e. $I_{max}-I_{min}$.

When the input voltage $V_{in}$, the output voltage $V_{out}$ and the inductance L remain constant, it may be assumed that the amplitude $I_{ripple}$ approximately corresponds to the amplitude in the boundary mode (at least at the beginning when the current $I_L$ becomes negative), i.e. $I_{ripple}=I_{max,B}$, the equation may be reformulated as follows:

$$I_{Av}=I_{Bound} \times (1-2 \times T_{ZC}/T_2) \qquad (5)$$

Thus, by selecting a given current threshold $I_{TH}$ for the average current $I_{AV}$ expressed as a percentage/ratio R of the average boundary current $I_{Bound}$, with 0<R<1, i.e.:

$$I_{TH}=R \times I_{Bound}=I_{Bound} \times (-2 \times T_{ZC}/T_2) \qquad (6)$$

it is possible to calculate the ratio $T_{ZC}/T_2$ when the control circuit 22a should switch from the high-power mode to the low power mode, i.e.:

$$T_{ZC}/T_2=0.5(1-R) \qquad (7)$$

For example, assuming that the control circuit 22a, e.g. the driver circuit 210, should switch from the high-power mode to the low power mode at R=80% of the average boundary current $I_{Bound}$, the threshold value TH may be calculated as follows:

$$T_{ZC}/T_2=0.5 \times 0.2, \text{ i.e. } T_{ZC}/T_2=TH=0.1 \qquad (8)$$

Accordingly, the control circuit 22a, e.g. the driver circuit 210, may be configured to switch from the high-power mode to the low power when $T_{ZC}>0.1 \times T_2$.

In general, the threshold TH may thus be determined in various modes, e.g. by calculating the threshold TH as a function of a requested percentage R of the average boundary current $I_{Bound}$ or the value TH may be determined empirically.

Figure 13:
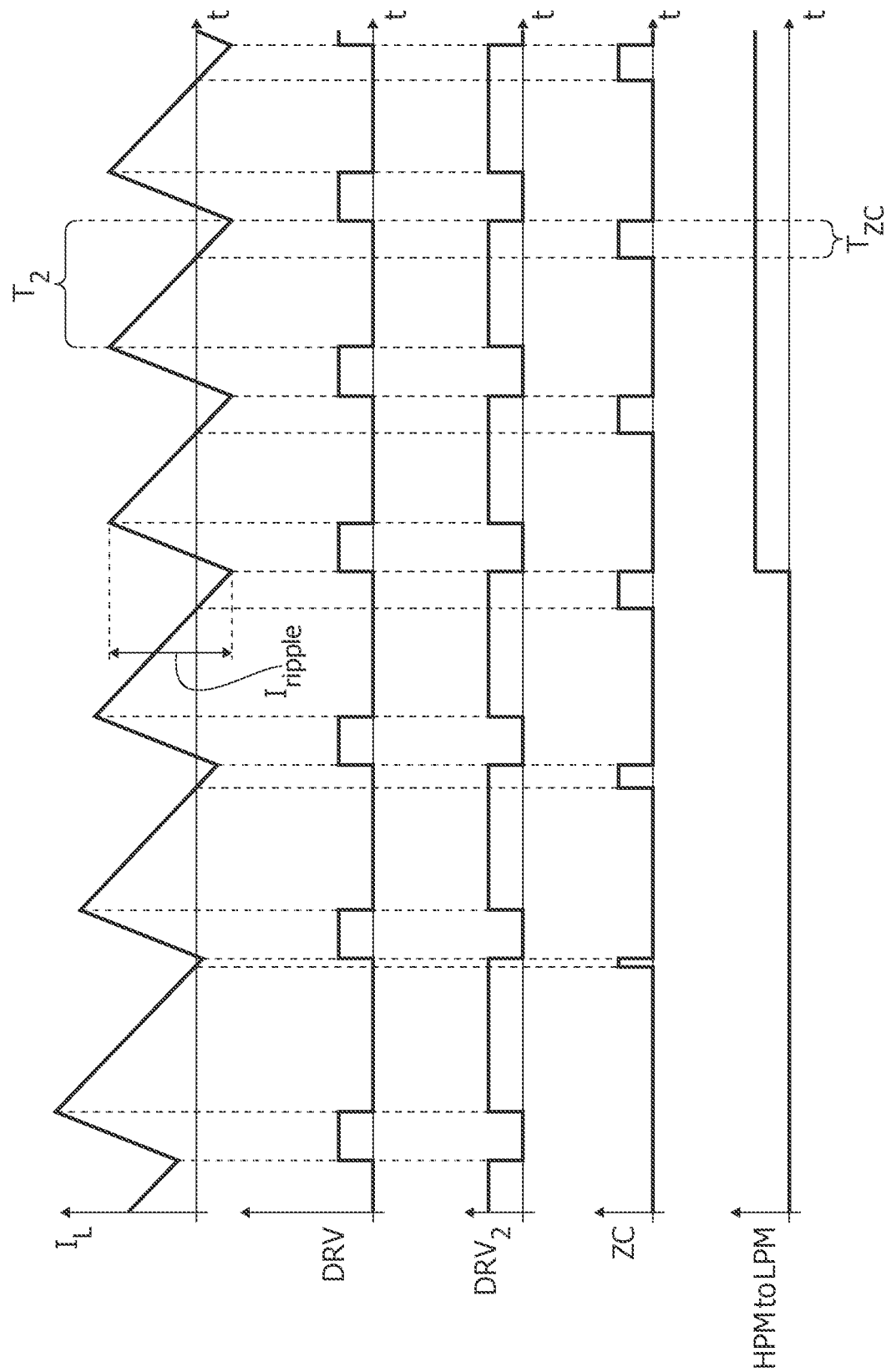
FIG. 13 shows an embodiment of the operation of the low-power detection circuit of FIG. 9.

FIG. 13 shows thus the operation of the low-power detection circuit 212. Specifically, in the embodiment considered, the low-power detection circuit 212 is configured to:

determine a first value indicative of the time $T_2$ elapsed between the instants $t_2$ and $t_1$, e.g. by monitoring one or more of the drive signals DRV, $DRV_1$ and $DRV_2$ (for determining the instants $t_2$ and $t_1$);

determine a second value indicative of the time $T_{ZC}$ elapsed between the instants $t_3$ and $t_1$, e.g. by monitoring the zero current signal (at least for determining the instant $t_3$ as shown in FIG. 11) and optionally one or more of the drive signals DRV, $DRV_1$ and $DRV_2$ (for determining the instants $t_1$);

determine whether the ratio between the time $T_{ZC}$ and the time $T_2$ is greater than a given threshold value TH; and generate a control signal HPMtoLPM indicating whether to switch from the high-power-mode (CCM) to the low-power mode (DCM, preferably a burst mode), wherein the signal HPMtoLPM is set to:

a first logic level (e.g. low) when the ratio between the time $T_{ZC}$ and the time $T_2$ is smaller than the given threshold value TH, thereby indicating that the high-power mode should be maintained, and a second logic level (e.g. high) when the ratio between the time $T_{ZC}$ and the time $T_2$ is greater than the given threshold value TH, thereby indicating that the low-power mode should be activated.

Generally, due to the fact that only binary signals have to be processed, the HPM-LPM control logic may be implemented with any analog and/or digital circuit, also including a microprocessor programmed via software instructions. Similarly, also one or more of the following circuits of the control circuit 22a may be implemented via a digital processing in a dedicated hardware circuit or via software instructions executed by a microprocessor:

at least part of the pulse generator circuit 220, such as the PI or PID regulator and/or the pulse generator 208, wherein the feedback circuit 24 or the control circuit 22a may comprise an analog-to-digital converter for the feedback signal FB; and/or the zero current detection circuit 26, wherein the current sensor or the zero current detection circuit 26 may comprise an analog-to-digital converter for the measurement signal CS or $V_{Lx}$.

Thus, in various embodiments, the control circuit 22a may be implemented with:

an analog-to-digital converter for the feedback signal FB;

an analog-to-digital converter for the measurement signal CS or $V_{Lx}$, or an analog comparator providing the zero current signal ZC;

driver circuits configured to drive the electronic switches Q1 and Q2 as a function of the drive signal $DRV_1$ and $DRV_2$; and a digital processing circuit, such as a microprocessor programmed via software instruction, configured to generate the drive signal $DRV_1$ and $DRV_2$ as a function of the digital feedback signal FB, and either the measurement signal CS (or $V_{Lx}$) or the binary zero current signal ZC.

Accordingly, the above hardware circuits (with or without the driver circuits) are usual components of modern microcontrollers, i.e. the integrated circuit 40 may be a microcontroller. Thus, in general, one or more of the circuits of the control circuit 22a shown in FIGS. 7 and 9 may be implemented via analog and/or digital circuits and/or software modules executed by a programmable processing circuit.

Moreover, in case the pulse generator 208 is implemented together with the low-power detection circuit 212, this circuit may already determine a value indicative of the time $T_2$ for generating the PWM signal DRV. Accordingly, this value may be used by the low-power detection circuit 212.

As mentioned before, in various embodiments, the low-power detection circuit 212 is configured to determine values indicative of the times $T_2$ and $T_{ZC}$ and compare these values with the threshold value TH. While the control circuit 22a already may manage a value indicative for the time $T_2$, at least the time $T_{ZC}$ has to be determined.

Generally, various analog or digital circuits are known for performing a time measurement.

Figure 14:
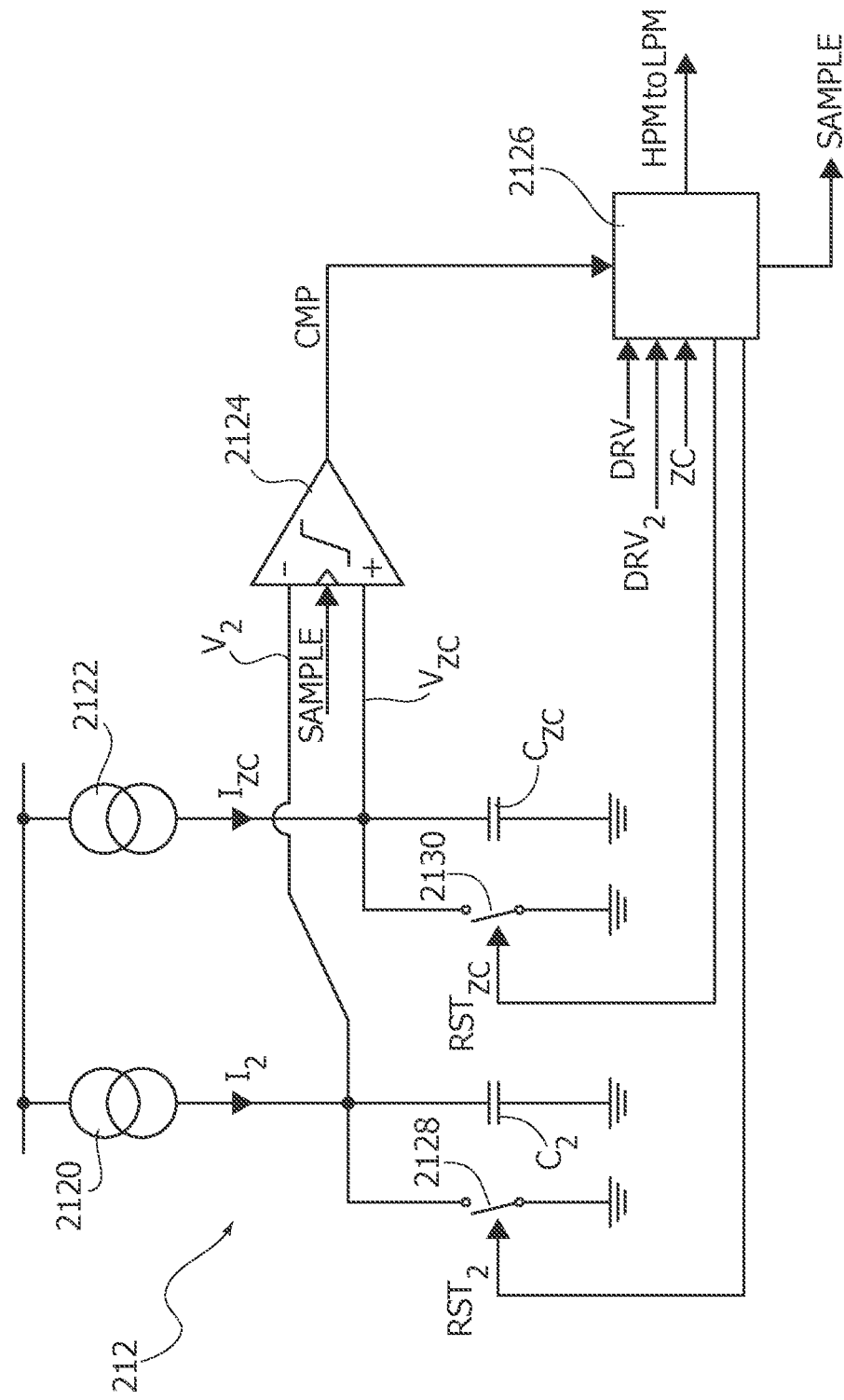
FIG. 14 shows an embodiment of the low-power detection circuit of FIG. 9.

FIG. 14 shows an embodiment of an analog solution, wherein the time-to-analog conversion is performed via an analog integrator.

Specifically, in the embodiment considered, the low-power detection circuit 212 comprises a first current generator 2120 configured to provide a current $I_2$ used to charge a capacitor $C_2$. Accordingly, assuming that the capacitor $C_2$ is initially discharged, the voltage $V_2$ at the capacitor $C_2$ may be calculated as:

$$V_2 = I_2/C_2 \times t \qquad (9)$$

Accordingly, when the current $I_2$ and the capacitance $C_2$ are constant, the (ramp) voltage $V_2$ is proportional to the charge time of the capacitor $C_2$. In the embodiment considered, the capacitor $C_2$ has thus connected in parallel an electronic switch 2128 configured to selectively short-circuit the capacitor $C_2$ as a function of a reset signal $RST_2$.

Similarly, the low-power detection circuit 212 comprises a second current generator 2122 configured to provide a current $I_{ZC}$ used to charge a capacitor $C_{ZC}$, and the (ramp) voltage $V_{ZC}$ at the capacitor $C_{ZC}$ is proportional to the charge time of the capacitor $C_{ZC}$. In the embodiment considered, the capacitor $C_{ZC}$ has thus connected in parallel an electronic switch 2130 configured to selectively short-circuit the capacitor $C_{ZC}$ as a function of a reset signal $RST_{ZC}$.

In the embodiment considered, the voltages $V_2$ and $V_{ZC}$ are provided to a comparison and sampling circuit 2124, configured to, in response to a sampling signal SAMPLE, set a comparison signal CMP to high when the voltages $V_{ZC}$ is greater than the voltage $V_2$ and to low when the voltages $V_{ZC}$ is smaller than the voltage $V_2$.

Finally, the low-power detection circuit 212 comprises a control circuit 2126 configured to generate the reset signals $RST_2$ and $RST_{ZC}$ and the sampling signal SAMPLE by determining the instants $t_1$, $t_2$ and $t_3$. For example, in various embodiments:

the reset signal $RST_2$ corresponds to the inverted version of the signal $DRV_2$;

the reset signal $RST_{ZC}$ corresponds to the inverted version of the zero current signal ZC; and the sampling signal SAMPLE corresponds to a trigger when the interval $T_2$ ends, e.g. in response to a falling edge of the drive signal $DRV_2$, or when the interval $T_1$ starts, e.g. in response to a rising edge of the PWM signal DRV.

Figure 15:
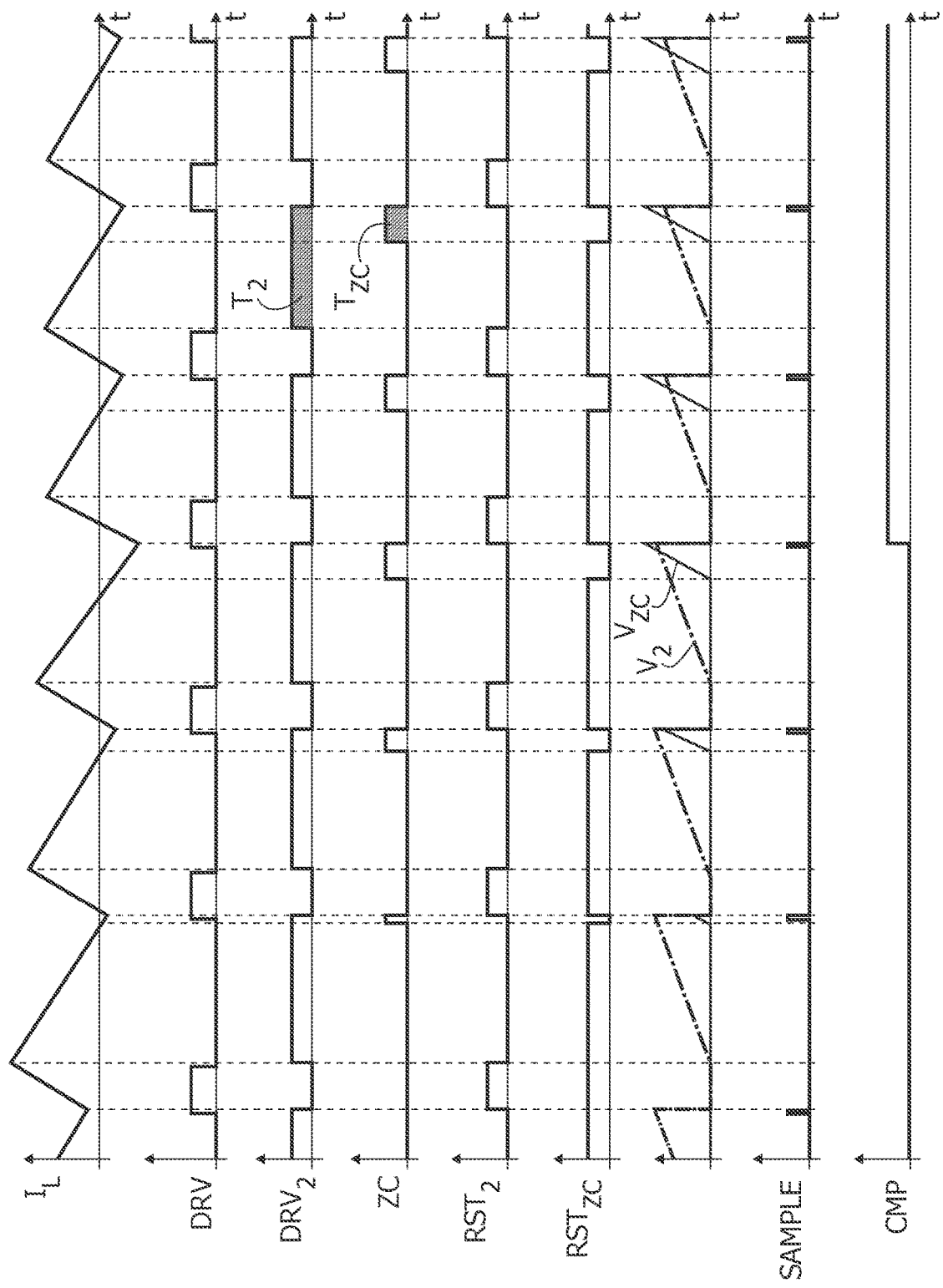
FIGS. 15, 16A, 16B, 17 and 18 show further embodiments of the low-power detection circuit of FIG. 9.

In the embodiment considered, and as also shown in FIG. 15, the low-power detection circuit 212 is thus configured to set the signal CMP at the end of the interval $T_2$/start of the interval $T_1$ when the voltage $V_{ZC}$ is greater than the voltage $V_2$. Thus, by dimensioning in a suitable manner the values of the capacitances $C_2$ and $C_{ZC}$ and the currents $I_2$ and $I_{ZC}$ it is possible to verify equation (1), i.e.:

$$V_{ZC} = I_{ZC}/C_{ZC} \times T_{ZC} > V_2 = I_2/C_2 \times T_2 \qquad (10)$$

For example, for the above example where the switching from the high-power-mode (CCM) to the low-power mode (DCM, preferably a burst mode) should occur for $T_{ZC} = 0.1 \times T_2$, the values $C_2$, $C_{ZC}$, $I_2$ and $I_{ZC}$ may be selected as, e.g.:

$$C_{ZC} = 0.1 C_2, I_{ZC} = I_2; \text{ or}$$

$$C_{ZC} = C_2, I_2 = 0.1 I_{ZC}.$$

In various embodiments, at least one of the values $C_2$, $C_{ZC}$, $I_2$ and $I_{ZC}$ is programmable, e.g. by using a variable current generator 2120 and/or 2122 and/or by using for the capacitors $C_2$ and/or $C_{ZC}$ a plurality of capacitors, which may be connected selectively in parallel.

Accordingly, in various embodiments, the control circuit 2126 is configured to set the signal HPMtoLPM as a function of the signal CMP. For example, in various embodiments, the signal HPMtoLPM corresponds to the signal CMP (other possible embodiments will be described in the following).

Generally, such an analog solution may thus be implemented rather easily via low power components being integrated in an analog control IC 40 or via external components providing the signal HPMtoLPM to the control IC.

Figure 16A:
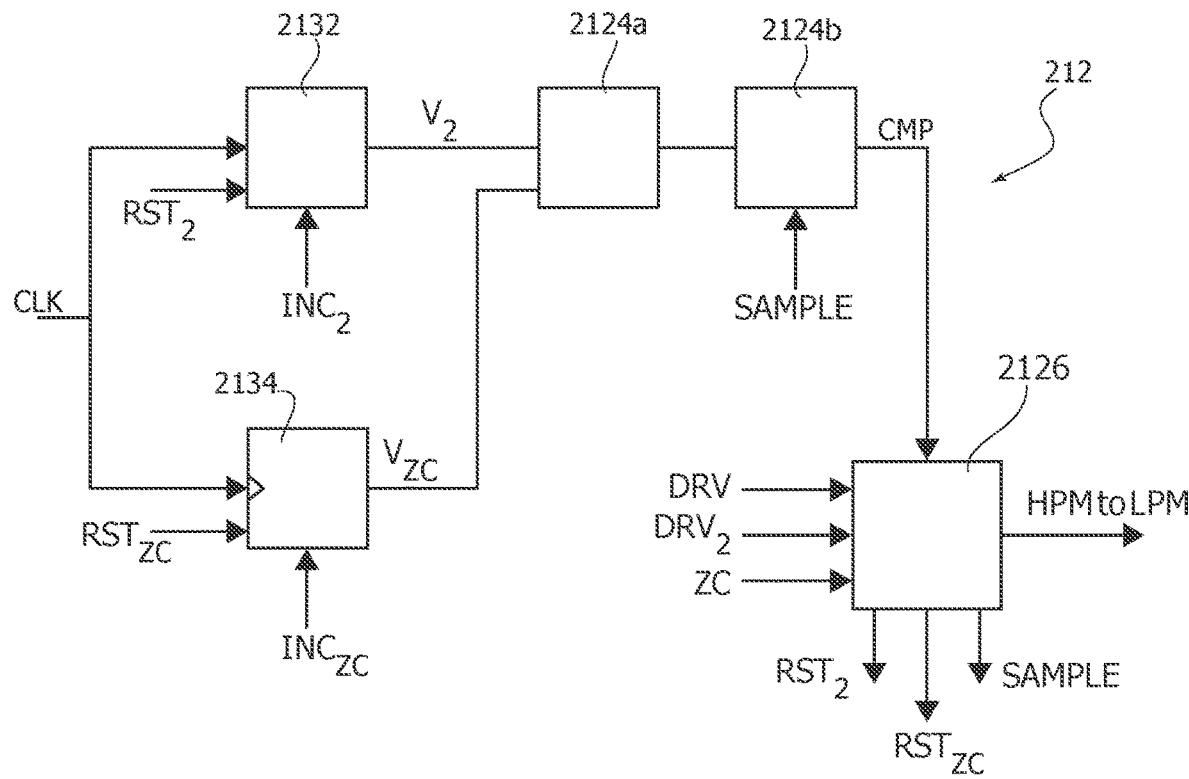
Figure 16B:
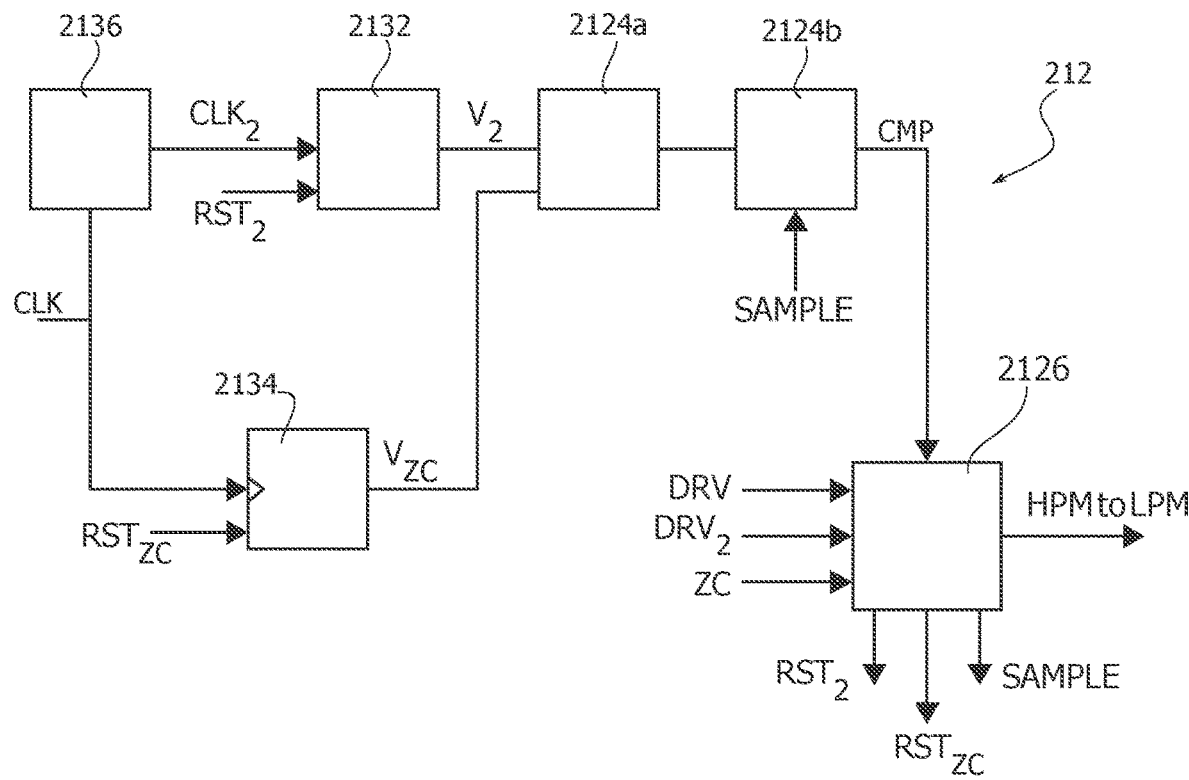

Instead, FIGS. 16A and 16B show two digital implementations.

Specifically, in the embodiments considered, the analog integrators have been replaced with digital counters 2132 and 2134, and similarly the analog comparator and sampling circuit 2124 has been replaced with a digital comparator 2124a and a digital sampling circuit 2124b.

Specifically, in the embodiment shown in FIG. 16A, the low-power detection circuit 212 comprises a first digital counter 2132 configured to:

increase a count value $V_2$ by a given increment value $INC_2$ in response to a clock signal CLK; and reset the count value $V_2$ in response to a reset signal $RST_2$.

Similarly, the low-power detection circuit 212 comprises a second digital counter 2134 configured to:

increase a count value $V_{ZC}$ by a given increment value $INC_{ZC}$ in response to the clock signal CLK; and reset the count value $V_{ZC}$ in response to a reset signal $RST_{ZC}$.

Accordingly, in line with the description of FIG. 14, the low-power detection circuit 212 may comprise:

a digital comparator circuit 2124a configured to set a signal when the count value $V_{ZC}$ is greater than the count value $V_2$;

a digital sampling circuit 2124b configured to provide a signal COMP by storing the signal provided by the digital comparator circuit 2124a in response to a sampling signal SAMPLE; and a digital control circuit configured to generate the reset signal $RST_{ZC}$ and $RST_2$, and the sampling signal SAMPLE, by detecting the instants $t_1$, $t_2$ and $t_3$, e.g. as a function of the signals DRV, $DRV_2$ and ZC. For example, in various embodiments:

the increment value $INC_{ZC}$ is greater than the increment value $INC_2$ by a factor which depends on the TH threshold;

the reset signal $RST_2$ corresponds to the inverted version of the signal $DRV_2$;

the reset signal $RST_{ZC}$ corresponds to the inverted version of the zero current signal ZC; and the sampling signal SAMPLE corresponds to a trigger when the interval $T_2$ ends, e.g. in response to a falling edge of the drive signal $DRV_2$, or when the interval $T_1$ starts, e.g. in response to a rising edge of the PWM signal DRV.

For example, for the above example where the switching from the high-power-mode (CCM) to the low-power mode (DCM, preferably a burst mode) should occur for $T_{ZC}$=0.1× $T_2$, the values $INC_2$ and $INC_{ZC}$ may be selected as, e.g.:

$INC_2$=1, $INC_{ZC}$=10.

In various embodiments, at least one of the values $INC_2$ and $INC_{ZC}$ is programmable.

Figure 17:
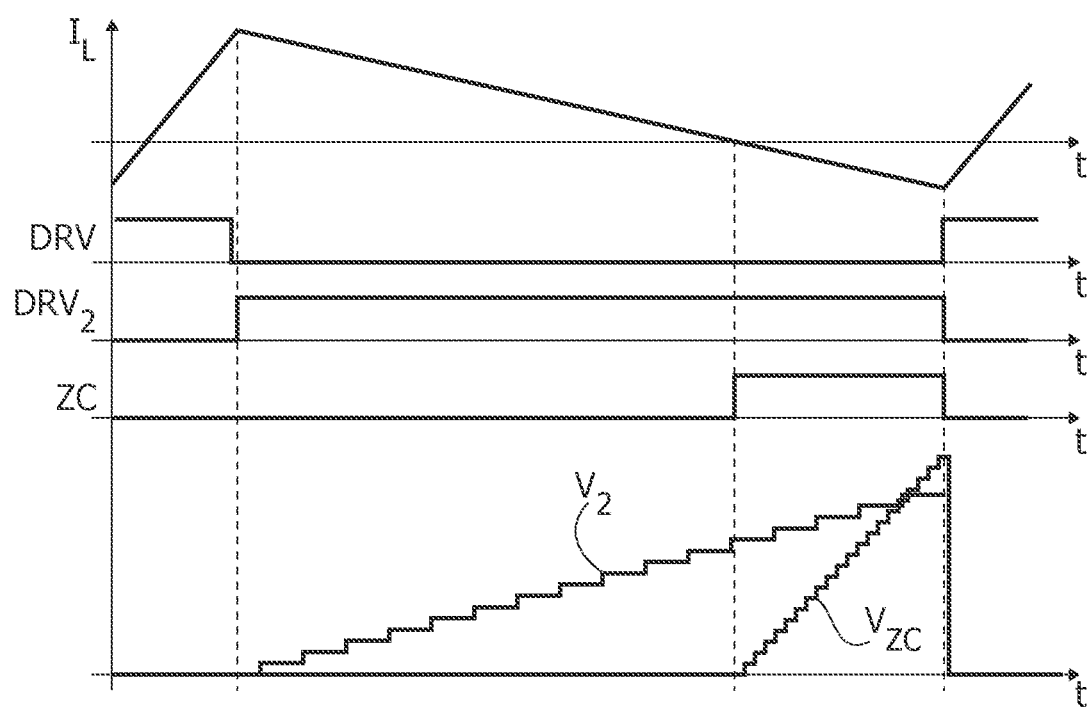

Conversely, in FIG. 16B, the increment value $INC_{ZC}$ corresponds to the increment value $INC_2$, i.e. $INC_{ZC}$=$INC_2$ (e.g. set to one), but a digital clock pre-scaler circuit 2136 is used to generate a clock signal $CLK_2$ for the counter 2132, wherein the clock signal $CLK_2$ has a frequency $F(CLK_2)$ reduced by a given pre-scaling factor with respect to the frequency $F(CLK)$ of the clock signal CLK, i.e. the count value $V_2$ is increased by a given increment value $INC_2$ only in response to a given number of clock cycles of the clock signal CLK, whereby the count value $V_2$ increases slower. For example, FIG. 17 shows possible behaviors of the count values $V_{ZC}$ and $V_2$.

For example, for the above example where the switching from the high-power-mode (CCM) to the low-power mode (DCM, preferably a burst mode) should occur for $T_{ZC}$=0.1× $T_2$, the frequencies of CLK and $CLK_2$ may be selected as, e.g.:

$F(CLK)/F(CLK_2)$=10.

Thus, the digital implementations of FIGS. 16A and 16B have the same functional behavior as the analog implementation of FIG. 14. Generally, the embodiments of 16A and 16B may also be combined, i.e. the increment value $INC_2$ and/or the increment value $INC_{ZC}$ and/or the pre-scaling factor of the clock signal $CLK_2$ (implemented in the circuit 2136) may be programmable.

Accordingly, also in these embodiments, the (digital) control circuit 2126 may be configured to set the signal HPMtoLPM as a function of the signal CMP. For example, in various embodiments, the signal HPMtoLPM corresponds to the signal CMP.

Conversely, in various embodiments, the control circuit 2126 comprises a counter configured to increase a count value $C_{CMP}$ when the signal CMP is set to high at the end/beginning of a switching cycle, and the control circuit 2126 is configured to set the signal HPMtoLPM when the count value $C_{CMP}$ reaches or exceeds a threshold value.

Conversely, in various embodiments, when the signal CMP is set to low at the end/beginning of a switching cycle, the counter control circuit 2126 may be configured to perform one of the following operation:

reset the count value $C_{CMP}$; or decrease the count value $C_{CMP}$.

Accordingly, in this case, the control circuit 2126 may indeed implement a comparator with hysteresis, wherein the control circuit 2126 is configured to:

set the signal HPMtoLPM to high when the count value $C_{CMP}$ reaches or exceeds an upper threshold value; and set the signal HPMtoLPM to low when the count value $C_{CMP}$ reaches or falls below a lower threshold value.

Figure 18:
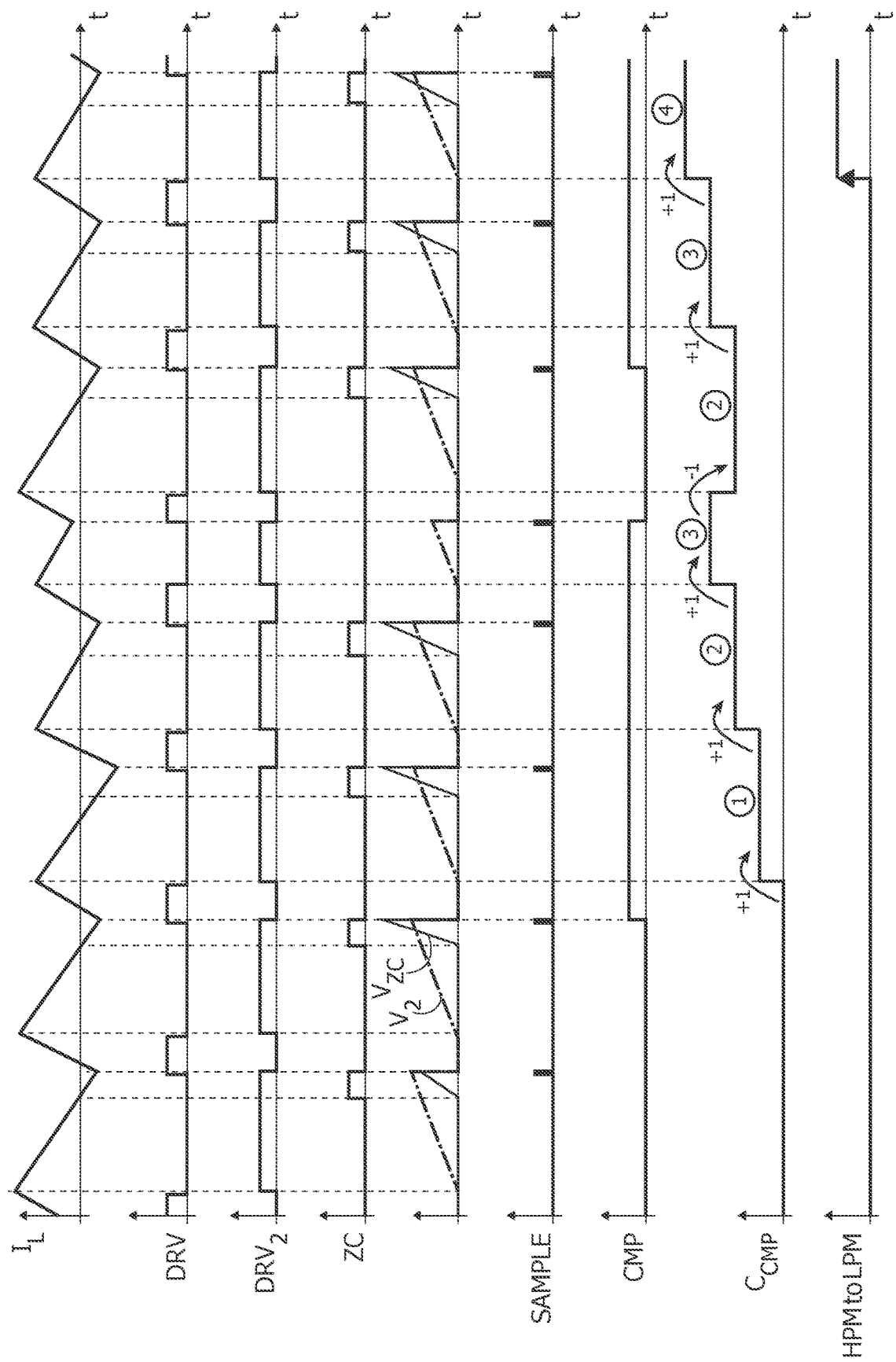

For example, FIG. 18 shows an embodiment, wherein un up-and-down counter is used and the upper threshold value corresponds to four and the lower threshold value corresponds to zero.

Accordingly, various embodiments of the present disclosure, have one or more of the following advantages:

the solution is independent from the values $V_{in}$, $V_{out}$, $T_{SW}$, and L;

rebounds between the operative modes are avoided, ensuring at the same time the passage in LPM also in case of small peak to peak current ripples;

jumps between the operating modes at the boundary may be avoided due to the hysteresis function implemented in the control circuit 2126.

Generally, the present disclosure relates mainly to the implementation of the low-power detection circuit, which triggers the switching from the high-power mode to the low-power mode. As such, this circuit operates only when the high-power mode/CCM is activated. Conversely, the switching from the low-power mode (DCM or burst mode), may be achieved rather easily, e.g. because at a given point the DCM or burst mode will be unable to provide sufficient power to the output terminals.

For example, when using in DCM a PWM modulation (for the drive signal DRV) with constant switching period $T_{SW}$, the switching stage 28 starts to operate at a given point automatically in CCM, which may be detected by the control circuit 22a, e.g. by monitoring the zero current signal ZC, which is not set at the end of the switching cycle $T_{SW}$.

Conversely, in a burst mode (e.g. with a constant time $T_1$), wherein a new switching cycle (with variable duration) is started at the instant when the feedback signal FB falls below a given lower threshold, it is sufficient that the second phase $T_2$ also ends when the feedback signal FB falls below the given lower threshold, whereby also in this case the switching stage 28 starts to operate at a given point automatically in CCM, which may be detected by the control circuit 22a, e.g. by monitoring the zero current signal ZC, which is not set at the end of the switching cycle $T_{SW}$.

Of course, without prejudice to the principle of the invention, the details of construction and the embodiments may vary widely with respect to what has been described and illustrated herein purely by way of example, without thereby departing from the scope of the present invention, as defined by the ensuing claims.

What is claimed is:

1. A control circuit comprising:
a low-power detection circuit configured to generate a control signal, wherein the low-power detection circuit is, when a driver circuit operates in a high-power mode, configured to:
   determine a first temporal value indicative of a duration of a second phase ($T_2$);
   detect whether a logic level of a zero current signal changes from a first logic level to a second logic level during the second phase ($T_2$);
   in response to detecting that the logic level of the zero current signal changes from the first logic level to the second logic level, determine a second temporal value indicative of a time ($T_{ZC}$) elapsed between an instant ($t_3$) when the logic level of the zero current signal changes from the first logic level to the second logic level during the second phase ($T_2$) and the instant ($t_1$) when the second phase ($T_2$) ends;
   determine whether a ratio between the second temporal value ($T_{ZC}$) and the first temporal value ($T_2$) is greater than a given number threshold value (TH);
   in response to determining that the ratio between the second temporal value ($T_{ZC}$) and the first temporal value ($T_2$) is smaller than the given threshold value (TH), set a comparison signal to the first logic level indicating that the high-power mode is to be maintained;
   in response to determining that the ratio between the second temporal value ($T_{ZC}$) and the first temporal value ($T_2$) is greater than the given threshold value (TH), set the comparison signal to the second logic level indicating that a low-power mode is to be activated; and
   set the logic level of the control signal as a function of the comparison signal.

2. The control circuit according to claim 1,
wherein the control signal corresponds to the comparison signal, or
wherein the low-power detection circuit is configured to increase a count value when the comparison signal is set to the second logic level, and set the control signal to a given logic level indicating that the low-power mode is to be activated when the count value reaches a respective count threshold value.

3. The control circuit according to claim 1, wherein the high-power mode is a continuous-conduction mode and the low-power mode is a discontinuous-conduction mode.

4. The control circuit according to claim 1, wherein the low-power detection circuit comprises:
   a first analog ramp generator configured to generate a first ramp signal with a first slope;
   a second analog ramp generator configured to generate a second ramp signal with a second slope; and
   an analog comparator and sampling circuit configured to generate the comparison signal by comparing the first ramp signal with the second ramp signal in response to a sampling signal;
   the control circuit of the low-power detection circuit configured to:
      activate the first analog ramp generator at the instant ($t_2$) when the second phase ($T_2$) starts;
      activate the second analog ramp generator at the instant ($t_3$) when the logic level of the zero current signal changes from the first logic level to the second logic level during the second phase ($T_2$); and
      set the sampling signal at the instant ($t_2$) when the second phase ($T_2$) ends, wherein a ratio between the first slope and the second slope corresponds to the given threshold value (TH).

5. The control circuit according to claim 4, wherein the first analog ramp generator and/or the second analog ramp generator comprises an analog integrator, the analog integrator comprising:
   an integration capacitor, wherein a voltage at the integration capacitor corresponds to the respective first or second ramp signal;
   a current generator configured to provide a current used to charge the integration capacitor; and
   an electronic switch configured to selectively short circuit the integration capacitor when the analog integrator is deactivated.

6. The control circuit according to claim 4, wherein the first slope and/or the second slope is programmable.

7. The control circuit according to claim 1, wherein the low-power detection circuit comprises:
   a first digital counter configured to increase a first count value by a first increment value in response to a first clock signal;
   a second digital counter configured to increase a second count value by a second increment value in response to a second clock signal;
   a digital comparator and sampling circuit configured to generate the comparison signal by comparing the first count value with the second count value in response to a sampling signal;
   the control circuit of the low-power detection circuit configured to:
      activate the first counter at the instant ($t_2$) when the second phase ($T_2$) starts;
      activate the second counter at the instant ($t_3$) when the logic level of the zero current signal changes from the first logic level to the second logic level during the second phase ($T_2$); and
      set the sampling signal at the instant ($t_2$) when the second phase ($T_2$) ends,
   wherein a ratio between the first increment value and the second increment value and/or a ratio between a frequency of the first clock signal and a frequency of the second clock signal define the given threshold value (TH).

8. The control circuit according to claim 7,
wherein the frequency of the first clock signal corresponds to the frequency of the second clock signal, whereby the ratio between the first increment value and the second increment value corresponds to the given threshold value (TH); or
wherein the first increment value corresponds to the second increment value, wherein the ratio between the frequency of the first clock signal and the frequency of the second clock signal corresponds to the given threshold value (TH).

9. The control circuit according to claim 7, wherein the ratio between the first increment value and the second increment value and/or the ratio between the frequency of the first clock signal and the frequency of the second clock signal are programmable.

10. The control circuit according to claim 1, further comprising the driver circuit configured to generate a first drive signal and a second drive signal, wherein the driver circuit is configured to switch from the high-power mode to the low-power mode as a function of the control signal.

11. An electronic converter comprising:
the control circuit according to claim 10;
a first drive terminal configured to provide the first drive signal to a first electronic switch of a switching stage; and
a second drive terminal configured to provide the second drive signal to a second electronic switch of the switching stage,
wherein the drive circuit is configured to:
repeat, in the high-power mode, the following switching phases for each switching cycle ($T_{SW}$) of a sequence of switching cycles:
for a first phase ($T_1$), close the first electronic switch and open the second electronic switch, and
for a following second phase ($T_2$), open the first electronic switch and close the second electronic switch,
wherein the driver circuit is configured to determine a duration of the first phase ($T_1$) and/or the second phase ($T_2$) as a function of a first feedback signal; and
repeat, in the low-power mode, the following switching phases for each switching cycle ($T_{SW}$) of a sequence of switching cycles:
for a first phase ($T_1$), close the first electronic switch and open the second electronic switch,
for a following second phase ($T_2$), open the first electronic switch and close the second electronic switch, and
for a following third phase ($T_3$), open the first electronic switch and open the second electronic switch,
wherein the driver circuit is configured to detect when the logic level of the zero current signal changes from the first logic level to the second logic level, and end the second phase ($T_2$) in response to detecting that the logic level of the zero current signal changes from the first logic level to the second logic level, and
wherein the driver circuit is configured to determine the duration of the first phase ($T_1$) and/or the third phase ($T_3$) as a function of said first feedback signal.

12. The electronic converter according to claim 11, further comprising:
a first feedback terminal configured to receive from a feedback circuit the first feedback signal proportional to an output voltage;
a second feedback terminal configured to receive from a measurement circuit a second feedback signal proportional to a current flowing through an inductance of the switching stage; and
a zero current detector configured to:
detect whether the second feedback signal falls below a given threshold value, and
in response to detecting that the second feedback signal falls below the given threshold value, change the logic level of a zero current signal from the first logic level to the second logic level.

13. The electronic converter according to claim 12, further comprising:
two input terminals configured to receive an input voltage;
two output terminals configured to provide the output voltage;
the switching stage connected between the two input terminals and the output terminals, the switching stage comprising the inductance, the first electronic switch and the second electronic switch configured to control the current flowing through the inductance;
the feedback circuit configured to provide the first feedback signal proportional to the output voltage; and
the measurement circuit configured to provide the second feedback signal proportional to the current flowing through the inductance.

14. The electronic converter according to claim 13, wherein the electronic converter is a buck converter, a boost converter, a buck-boost converter or a half-bridge converter.

15. A method for operating the electronic converter according to claim 12, the method comprising:
generating, by the zero current detector, the zero current signal as the function of the second feedback signal;
generating, by the driver circuit, the first drive signal and the second drive signal as the function of the first feedback signal, the zero current signal and the control signal; and
generating, by the low-power detection circuit, the control signal as the function of the zero current signal and the given threshold value (TH).

16. The method according to claim 15, further comprising:
determining the given threshold value (TH) as the function of a requested percentage of an average value of the current flowing through the inductance when the electronic converter operates in a boundary condition between a continuous-conduction mode and a discontinuous-conduction mode.

* * * * *